US010081070B2

(12) United States Patent
Lee

(10) Patent No.: US 10,081,070 B2
(45) Date of Patent: Sep. 25, 2018

(54) BACKFIRE PREVENTING GAS CUTTING APPARATUS

(71) Applicant: BOOL BOOL CO., LTD., Siheung-si, Gyeonggi-do (KR)

(72) Inventor: Myung-Hee Lee, Siheung-si (KR)

(73) Assignee: Bum-Ho Lee, Yongin-si, Gyeonggi-Do (KR)

( * ) Notice: Subject to any disclaimer, the term of this patent is extended or adjusted under 35 U.S.C. 154(b) by 175 days.

(21) Appl. No.: 14/763,399

(22) PCT Filed: Jan. 22, 2014

(86) PCT No.: PCT/KR2014/000640
§ 371 (c)(1),
(2) Date: Jul. 24, 2015

(87) PCT Pub. No.: WO2014/116032
PCT Pub. Date: Jul. 31, 2014

(65) Prior Publication Data
US 2015/0360312 A1    Dec. 17, 2015

(30) Foreign Application Priority Data

Jan. 25, 2013  (KR) .................. 10-2013-0008778
Jun. 17, 2013  (KR) .................. 10-2013-0069170
(Continued)

(51) Int. Cl.
*B23K 7/10*       (2006.01)
*F23D 14/42*      (2006.01)
(Continued)

(52) U.S. Cl.
CPC .............. *B23K 7/10* (2013.01); *F23D 14/42* (2013.01); *F23D 14/54* (2013.01); *F23D 14/82* (2013.01)

(58) Field of Classification Search
CPC ........... B23K 7/10; F23D 14/42; F23D 14/54; F23D 14/82
(Continued)

(56) References Cited

U.S. PATENT DOCUMENTS 3,042,106 A * 7/1962 Werner ................... F23D 14/54
                                                     239/419
3,386,665 A * 6/1968 Iozzi ....................... F23D 14/38
                                                   239/416.1
(Continued)

FOREIGN PATENT DOCUMENTS

CN        2313696 Y     4/1999
CN        2359541 Y     1/2000
(Continued)

*Primary Examiner* — Jessee Roe
*Assistant Examiner* — Michael Aboagye
(74) *Attorney, Agent, or Firm* — Novick, Kim & Lee, PLLC; Jae Youn Kim

(57) ABSTRACT

Provided is a backfire preventing gas cutting apparatus for cutting a workpiece by heating the workpiece using a preheating flame and injecting cutting oxygen and comprises: a nozzle bundle which is coupled with a valve bundle wherein the nozzle bundle comprises: a tip having a flame outlets formed at the front end thereof; and a head frame coupled with the tip. An injecting unit is formed on the inside of the head frame for enabling the laminar flow of the fuel gas through the injecting flow path by increasing a flow rate of the preheating oxygen introduced into the injecting flow path.

4 Claims, 21 Drawing Sheets

(30) Foreign Application Priority Data

Jul. 15, 2013 (KR) .......................... 10-2013-0083150
Dec. 13, 2013 (KR) .......................... 10-2013-0155889

(51) Int. Cl.
*F23D 14/54* (2006.01)
*F23D 14/82* (2006.01)

(58) Field of Classification Search
USPC ........ 219/70, 74, 75, 137.31, 138, 139, 136,
219/144; 266/48, 49, 74; 431/158, 353;
137/614.2
See application file for complete search history.

(56) References Cited

U.S. PATENT DOCUMENTS

| | | | | |
|---|---|---|---|---|
| 5,407,348 | A * | 4/1995 | Mims | F23D 14/42 |
| | | | | 137/454.2 |
| 5,467,928 | A * | 11/1995 | Goulet | F23D 14/42 |
| | | | | 239/404 |
| 5,688,469 | A * | 11/1997 | Edenfield | B23K 7/08 |
| | | | | 266/48 |
| 6,824,735 | B2 * | 11/2004 | Pryor | F23D 14/42 |
| | | | | 239/414 |

FOREIGN PATENT DOCUMENTS

| | | |
|---|---|---|
| KR | 10-2007-0119434 A | 12/2007 |
| KR | 10-2011-0041343 A | 4/2011 |
| KR | 10-2012-0010594 A | 2/2012 |
| KR | 10-1230237 B1 | 2/2013 |

* cited by examiner

BACKFIRE PREVENTING GAS CUTTING APPARATUS

TECHNICAL FIELD

The present invention relates to a gas cutting apparatus, and more particularly, to a backfire preventing gas cutting apparatus for cutting a workpiece by heating the workpiece using preheating frame and injecting cutting oxygen.

BACKGROUND ART

In general, a frame intake of a gas cutting apparatus may configured so that cutting oxygen is injected through a central portion thereof, and preheating frame for preheating a workpiece is formed around the cutting oxygen. Here, the preheating flame ignites a mixed gas that is generated by mixing gaseous oxygen with fuel gas, which are supplied into the gas cutting apparatus.

A general gas cutting apparatus may be classified into a torch mixing type cutting apparatus in which oxygen and fuel gases are mixed with to generate preheating flame and a nozzle (flame outlet) mixing type cutting apparatus. In detail, the gas cutting apparatus may be classified into a first type cutting apparatus and a third type cutting apparatus according to the KS B4601 standard.

Here, in the first type cutting apparatus according to the KS B4601 standard that is the torch mixing type cutting apparatus, oxygen and fuel gas are mixed with each other within a valve bundle including a handle, and then, the mixed gas is supplied into a flame outlet.

In case of the torch mixing type gas cutting apparatus, since flame is introduced into a valve bundle in which a mixed gas is generated when backfire occurs, the backfire may occur in use. Also, if the backfire occurs, the valve bundle may be heated by the flame introduced into the valve bundle to allow a worker to be burnt or to reduce a lifecycle of the valve bundle. In addition, a pressure within the valve bundle may increase to damage a fuel gas tube or fuel gas container.

On the other hand, in the third type cutting apparatus according to the KS B4601 standard that is the nozzle mixing type cutting apparatus, oxygen and fuel gases, which are supplied through the valve bundle reach a nozzle along separate paths and then are mixed with each other in the nozzle to generate a mixed gas.

The nozzle nixing type gas cutting apparatus may have low possibility in backfire. However, it is difficult to stably supply the fuel gas that has a relatively low pressure when compared to that of the oxygen. As a result, it may take a long time to preheat a workpiece. To compensate the above-described problems, if the fuel gas increases in pressure, the backfire may occur to increase in possibility of an accident occurrence.

RELATED PRIOR DOCUMENTS

Prior Art 1: Korean Patent Publication No. 10-2011-0041343
Prior Art 2: U.S. Pat. No. 6,824,735

DISCLOSURE OF THE INVENTION

Technical Problem

Embodiments of the present invention provide a backfire preventing gas cutting apparatus in which backfire does not fundamentally occur, or flame does not reach a head even though the backfire occurs.

Embodiments of the prevent invention also provide a backfire preventing gas cutting apparatus in which a sealed state of an injecting part is maintained even though a head is heated.

Embodiments of the prevent invention also provide a backfire preventing gas cutting apparatus having improved thermal efficiency by a mixed gas.

Embodiments of the prevent invention also provide a backfire preventing gas cutting apparatus in which heating of a head is minimized to extend a lifecycle of the head.

Embodiments of the present invention also provide a backfire preventing gas cutting apparatus in which a process of coupling an injecting flow path provided in a head frame to an injection gas inlet hole provided in a tip to communicate with each other is very quickly and easily performed by a non-skilled person when the tip is coupled to the head frame.

Embodiments of the present invention also provide a backfire preventing gas cutting apparatus in which movement of a tip is maximally prevented to maintain a sealed state when the tip is coupled to a head frame, thereby preventing an injecting flow path and an injection gas inlet hole, which communicate with each other, from being misaligned with each other and preventing a gas and oxygen from being mixed with each other due to contact between the head frame and the tip.

The present invention also provide a backfire preventing gas cutting apparatus in which a connection flow path is formed between a cutting oxygen flow path of a head frame and a cutting oxygen flow path of a tip to delay heat transfer into the cutting oxygen flow path of the head frame through the cutting oxygen flow path of the tip, thereby maximally preventing the head frame from being overheated.

The present invention also provide a backfire preventing gas cutting apparatus in which preheating oxygen and a fuel gas are not mixed with each other, but laminar flows to form a layer, oxygen and a gas are mixed with each in a tip to minimize a difference in pressure in a mixed gas path to prevent backfire from occurring, flame does not reach a head even though the backfire occurs, a seated state of an injecting part is maintained even though the head is heated, the head is simplified in structure to reduce a manufacturing time and cost and improve a mixing rate of the mixed gas, and the heating of the head is minimized to extend a lifecycle of the head.

In general, when a front end of the tip is blocked or a flame outlet changes in pressure to change in pressure within the mixed gas path, a flow of the mixed gas changes by the pressure difference. Thus, the backfire may occur in the mixed gas while the flame of the front end of the tip moves toward the position at which the pressure change occurs.

Thus, to maximally reduce the backfire, the preheating oxygen and the fuel gas may be mixed with each other to maximally reduce the pressure change while the mixed gas moves up to the front end of the tip. For example, first, an injection rate of the oxygen may increase in an injecting section in which the gas and the oxygen coexist with each other to allow the oxygen to laminar flow without being mixed with the gas. When the oxygen and the gas are not maintained to a layer in the injection section, but are mixed with each other, the backfire may occur up to the injection section. Thus, it is important to maintain the layer of the oxygen and the gas in the injection section.

Second, the layer of the oxygen and the gas may be formed in the injection section and injected. Then, the injected oxygen and gas may be mixed with each other, and a change in pressure while the mixed gas is injected up to the front end of the tip has to be minimized.

Third, a path along which the oxygen and gas which are injected to form the layer in the injection section reach the tip has to be maintained in sealing to minimize a change in pressure.

Technical Solution

To achieve the above-described objects, a backfire preventing gas cutting apparatus includes a valve bundle in which gaseous oxygen and a fuel gas separately flow and a nozzle bundle coupled to the valve bundle and in which a flame outlet is disposed, characterized in that a branch part through which the oxygen is divided into cutting oxygen and preheating oxygen to flow into the nozzle bundle through respective flow paths is disposed in the valve bundle, the nozzle bundle includes a tip having the flame outlet disposed at a front end thereof and a head frame to which the tip is coupled, a cutting oxygen flow path through which the cutting oxygen introduced from the valve bundle flows into the tip, an injecting flow path through which the preheating oxygen and the fuel gas introduced from the valve bundle flow into the tip, and an injecting part for enabling laminar flow of the fuel gas through the injecting flow path by increasing a flow rate of the preheating oxygen introduced into the injecting flow path are disposed in the head frame, a cutting oxygen inlet hole connected to the cutting oxygen flow path and an injecting gas inlet hole connected to the injecting flow path are respectively defined in a rear end of the tip, and a mixing room having a cross-sectional area greater than that of the injecting gas inlet hole so as to generate a combustible mixed gas from the preheating oxygen and the fuel gas which are introduced from the injecting gas inlet hole while generating the laminar flow.

Also, a cutting oxygen injecting hole defined in a central portion of the flame outlet and through which the cutting oxygen is injected and a mixed gas injecting hole defined around the cutting oxygen injecting hole and through which the mixed gas is injected may be defined in the flame outlet.

Also, the injecting part may include: an injecting core having a tapered surface having an outer diameter that gradually decreases toward a front end thereof and a preheating oxygen injecting hole through which the preheating oxygen introduced into a rear end thereof is injected to the front end; and an injecting cap having a shape corresponding to that of the front end of the injecting core and disposed to be spaced in a direction of the front end of the injecting core, the injecting cap having the injecting flow path in a central portion thereof, wherein a fuel gas chamber through which the fuel gas introduced from the valve bundle flows into the injecting flow path may be defined between the injecting core and the injecting cap.

Also, each of the injecting core and the injecting cap may be integrated with the head frame.

Also, the head frame comprises a cylindrical distributor inserted into and coupled to a distributor insertion hole defined in the head frame, and the distributor may include:

a distributor body having a cutting oxygen bypass groove that is recessed from an outer circumferential surface of the distributor to allow the cutting oxygen to flow through the cutting oxygen flow path; and an injecting core part having a tapered surface disposed on a front end of the distributor body with an outer diameter that gradually decreases toward a front end of the distributor, a preheating oxygen inlet hole that is radially defined from the outer circumferential surface of the distributor to a central portion thereof and defined in the outer circumferential surface of the distributor in a direction of a front end of the distributor than the cutting oxygen bypass groove, and a preheating oxygen injecting hole connected from a portion disposed at the central portion of the preheating oxygen inlet hole to the front end of the distributor to inject the preheating oxygen introduced into the preheating oxygen inlet hole toward the front end of the distributor, an injecting cap part, which has a shape corresponding to the injecting core part disposed to be spaced in a direction of a front end of the injecting core part, of which a central portion is connected to the injecting flow path and a fuel gas chamber defined between the injecting core and the injecting cap, and through which the fuel gas introduced from the valve bundle flows into the injecting flow path, may be respectively disposed in the head frame, and the injecting core part, the injecting cap part, and the fuel gas chamber define the injecting part.

Also, at least one welding groove in at least one of a portion of an outer circumferential surface of the distributor between a tapered surface and the preheating oxygen inlet hole, a portion between the preheating oxygen inlet hole and a cutting oxygen bypass groove, and a portion in a rear direction than the cutting oxygen bypass groove and heating a welding rod having a ring shape or a welding material having a powder state in the welding groove to fuse the welding rod or material may be welded and coupled to an inner circumferential surface of the distributor insertion hole.

Also, the welded coupling is performed by forming at least one welding groove in at least one of a portion of an outer circumferential surface of the distributor between a tapered surface and the preheating oxygen inlet hole, a portion between the preheating oxygen inlet hole and a cutting oxygen bypass groove, and a portion in a rear direction than the cutting oxygen bypass groove and heating a welding rod having a ring shape or a welding material having a powder state in the welding groove to fuse the welding rod or material to an inner circumferential surface of the distributor insertion hole.

Also, a cooling flow path having a groove shape, through which the cutting oxygen introduced into the tip through the cutting oxygen flow path flows may be defined in a rear end surface of the tip. The cooling flow path may include: a plurality of linear cooling flow paths radially defined from the cutting oxygen flow path in a direction of an edge of the rear end surface of the tip; and a curved cooling flow path defined along an edge portion of the rear end surface to connect ends of the linear cooling flow paths to each other.

Also, a seating groove into which a rear end of the tip is seated is defined in the head frame, the head frame comprises a fixing pin which is coupled to the seating groove so that an end of the fixing pin protrudes, a pin insertion hole into which the fixing pin is inserted is defined in the rear end of the tip, and when the fixing pin is inserted into the pin insertion hole, the injecting gas inlet hole is connected to the injecting flow path, or when the injecting gas inlet hole is provided in plurality, and the fixing pin is inserted into one of the plurality of injecting gas inlet holes, the other one of the plurality of injecting gas inlet holes is connected to the injecting flow path.

Also, the injecting core, the injecting flow path, the injecting gas inlet hole, and the mixing room may be disposed in a line.

Also, a backfire preventing gas cutting apparatus in which a cutting oxygen flow path and an injecting flow path which are defined in a head frame and a cutting oxygen flow path and an injecting gas inlet hole which are defined in a tip communicate with each other and are coupled to each other by using a coupling member, the backfire preventing gas cutting apparatus comprising a head coupled so that contact surfaces facing each other of the head frame and the tip are closely attached to each other by a fastening force of the coupling member, is characterized in that one end of an alignment tube is fixed to one of the injecting flow path of the head frame or the injecting gas inlet hole of the tip, and when the head frame and the tip are coupled to each other, an exposed end of the alignment tube is fitted into the injecting gas inlet hole or the injecting flow path which are disposed in the other side to match centers of the injecting flow path of the head frame and the injecting gas inlet hole of the tip with each other.

Also, the backfire preventing gas cutting apparatus may further include a packing fitted onto an outer circumference of the alignment tube, wherein a packing groove into which the packing is inserted may be defined in the tip.

Also, the tip may include an outer tip and an inner tip, a mixed gas flow path may be defined between the outer tip and the inner tip, flange parts inserted into and hooked with the coupling member in a state where the flange parts overlap each other are disposed rear ends of the outer tip and the inner tip, respectively, the flange parts have the same outer diameter, and an alignment hole into which the flange parts are inserted and accommodated in a state where the flange parts overlap each other is defined in the coupling member.

Advantageous Effects

According to the embodiments of the present invention, since a combustible mixed gas in which the preheat oxygen and the fuel gas are mixed with each other is generated in the tip, if the backfire occurs, the flame may not reach the head, but reach the inside of the tip. Thus, the heating of the head may be minimized to improve the stability and extend the lifecycle of the head.

Also, according to the embodiments of the present invention, since it is unnecessary to provide the sealing member that is vulnerable to heat within the head frame, the sealed state of the injecting part may be maintained even though the head is heated to improve the durability and stability.

Also, according to the embodiments of the present invention, since the injecting part in which the injecting gas is generated is disposed within the head, the reduction of the flame power due to the leakage of the fuel gas and the possibility of the accident occurrence due to the backfire may be minimized to enhance the flame power.

Also, according to the embodiments of the present invention, the injecting part provided in the head may be simplified to reduce the manufacturing time and cost.

Also, according to the embodiments of the present invention, a cooling flow path along which the cutting oxygen flows may be defined in the tip to cool the tip, thereby minimizing the heating of the head in working.

According to the present invention, when the head fame and the tip are coupled to each other, the alignment tube that is fixed to one side of the injection flow path of the head frame and the injecting gas inlet hole of the tip may be simply fitted into the injecting flow path or the injecting gas inlet hole which is disposed in the other side of the injection flow path to allow the centers of the injecting flow path of the head frame and the injecting gas inlet hole of the tip to accurately match each other. Thus, when the head frame and the tip are coupled to each other, the process of aligning the injecting flow path with the injecting gas inlet hole may be very quickly and easily performed even the non-skilled person. Also, since the movement of the tip with respect to the head frame may be prevented by the alignment tube, the sealed state of the injecting flow path and the injecting gas inlet hole may be maintained even though the backfire preventing gas cutting apparatus is used for a long time, and the misalignment between the injecting flow path and the injecting gas inlet hole may be prevented to effectively prevent the backfire from occurring.

Also, the packing fitted around the alignment tube may be provided, and the packing groove in which the packing is inserted may be defined in a side of the injecting gas inlet hole. Thus, when the head frame and the tip are coupled to each other, the sealing between the alignment tube and the head frame including the alignment tube or tip may be maintained. In addition, even through the fine gap between the head frame and the tip is formed due the long-time using, the sealing between the cutting oxygen flow path and the injecting gas inlet hole may be maintained by the packing to prevent the backfire from occurring.

Also, according to the present invention, since the flange part disposed on each of the inner and outer tips constituting the tip is fitted in the state where the flange part overlaps the alignment hole of the coupling member and then is hooked with and maintained to the coupling member, when the head frame and the tip are coupled to each other, the centers of the inner and outer tips constituting the tip may automatically match each other. Thus, the assembly of the tip may be improved, and the gas path in a circumferential direction may be uniformly disposed in a concentric shape to smoothly maintain the flow of the gas.

Also, according to the present invention, the connection flow path may be formed from the cutting oxygen flow path disposed at the central portion of the tip to the outside in a radius direction to connect the cutting oxygen flow path of the head frame to the cutting oxygen flow path of the tip. Thus, when compared that the high-temperature heat is directly transferred into the cutting oxygen flow path of the head fame through the cutting oxygen flow path of the tip, the heat transfer through the connection flow path may be delayed to maximally prevent the heat frame from being overheated.

According to the present invention, since the combustible mixed gas in which the preheating oxygen and the fuel gas are mixed with each other is generated in the tip to reduce a difference in pressure of the mixed gas due to the short flow path within the tip, thereby preventing the backfire from occurring. Therefore, the torch in addition to the tip and the head may be extended in lifecycle, and the worker's safety may be maintained.

According to the present invention since the injecting part is disposed within the head, the reduction of the flame power due to the leakage of the fuel gas and the possibility of the accident occurrence due to the backfire may be minimized to enhance the flame power. In addition, the injecting part may be simplified in structure to reduce the manufacturing time and cost.

MODE FOR CARRYING OUT THE INVENTION

Figure 1:
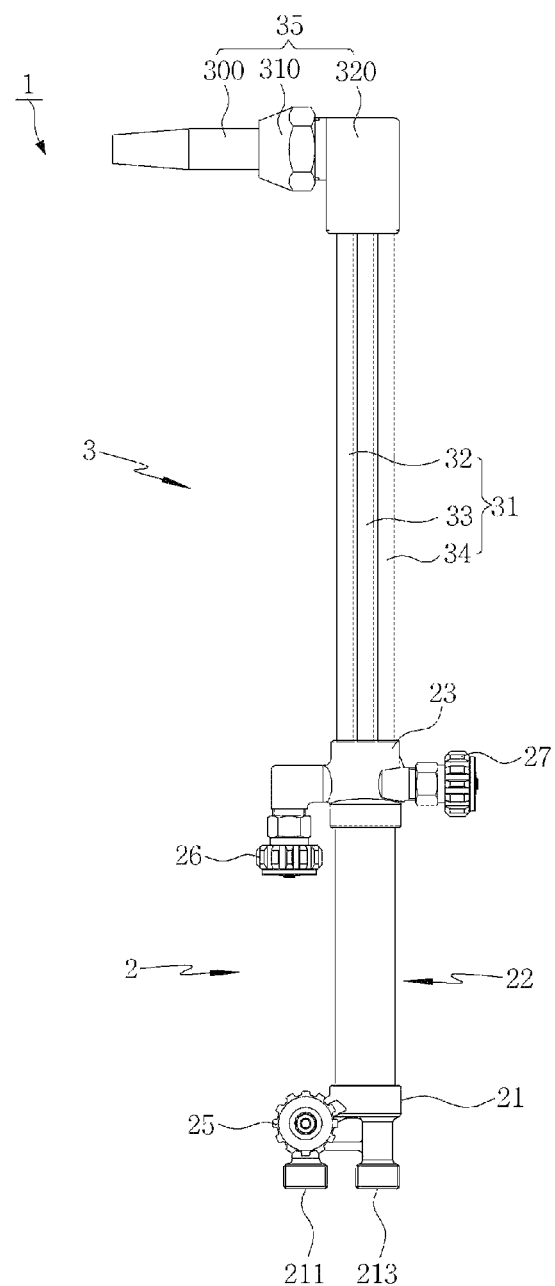
FIG. 1 is a front view of a gas cutting apparatus according to a first embodiment of the present invention.

Since the present invention may have diverse modified embodiments, specific embodiments are illustrated in the drawings and are described in detail. However, this does not limit the present invention within specific embodiments and it should be understood that the present invention covers all the modifications, equivalents, and replacements within the idea and technical scope of the present invention. Moreover, detailed descriptions related to well-known functions or configurations will be ruled out in order not to unnecessarily obscure subject matters of the present invention.

Note that the same or similar components in the drawings are designated by the same reference numerals as far as possible even if they are shown in different drawings. In the following description of the present disclosure, a detailed description of known functions and configurations incorporated herein will be omitted.

Also, in the description of the operation of the device according to the present invention, since the drawings according to another embodiment as well as the drawings according to the corresponding embodiment are described, the present invention will be understood with reference to the corresponding drawings and the related drawings.

Hereinafter, embodiments of the present invention will be described in detail with reference to the accompanying drawings.

FIG. 1 illustrates a gas cutting apparatus according to an embodiment of the present invention.

Referring to FIG. 1, a gas cutting apparatus 1 according to an embodiment of the present invention includes a valve bundle 2 and a nozzle bundle 3.

The valve bundle 2 may be a portion through which gaseous oxygen and a fuel gas flow. The valve bundle 2 includes a supply hole frame 21, a handle part 22, and a valve frame 23.

The nozzle bundle 3 includes a head 35 and a neck 31 connected to the head 35.

The head 35 includes a tip 300 in which a flame outlet (see reference numeral 349 of FIG. 3) is formed at a front end thereof, a head frame 300, and a coupling member 310 for coupling the tip 300 to the head frame 320 and maintaining the hooking between the tip 300 and the head frame 320. Also, the neck 31 includes a fuel gas tube 32, a preheating oxygen tube 33, and a cutting oxygen tube 34. As illustrated in FIG. 1, the neck 31 connects the head frame 320 to the valve frame 23.

For reference, the tip 300 in which the flame outlet 349 is formed may be heated by a large amount of heat during a cutting process, and also, foreign substances such as scattering metal oxide may be attached to the tip 300. Thus, the tip may have relatively short lifecycle when compared to that of the head frame 320. Also, a flame power required for performing the cutting process may vary according to physical properties of a workpiece (not shown) to be cut. Thus, the tip 300 may be separably coupled to the head frame 320. As necessary, the tip 300 may be replaced.

Figure 2:
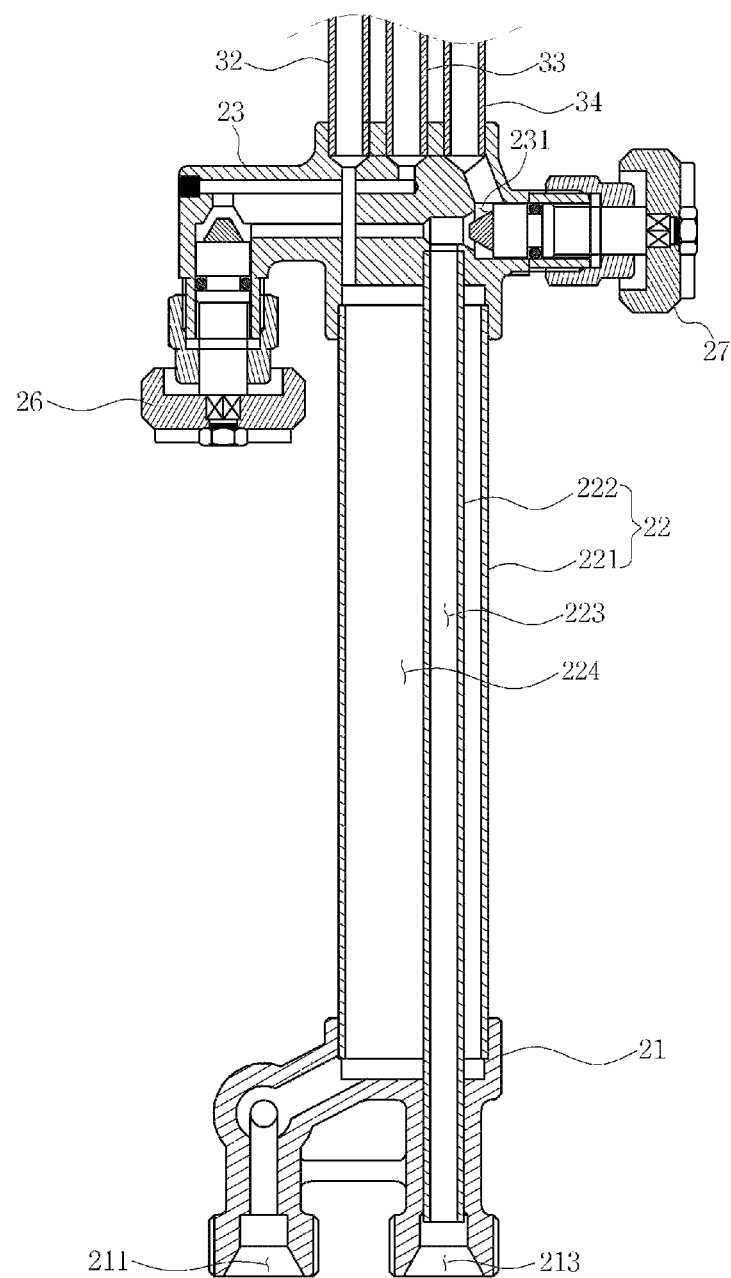
FIG. 2 is a cross-sectional view of a valve bundle of the gas cutting apparatus illustrated in FIG. 1.

FIG. 2 is a cross-sectional view of a valve bundle of the gas cutting apparatus illustrated in FIG. 1.

The valve bundle 2 will be described with reference to FIG. 2 together with FIGS. 1 and 2.

A fuel gas supply hole 211 through which a fuel gas is supplied and an oxygen supply hole 213 are formed in the supply hole fame 21. Also, a fuel gas adjusting valve 25 for adjusting an inflow amount of the fuel gas through the fuel gas supply hole 211 may be disposed in the supply hole fame 21. The handle part 22 is coupled to a rear end of the supply hole frame 21.

The handle part 22 includes an inner tube 222 and an outer tube 221.

The outer tube 221 has a shape in which a user is capable of grasping an outer circumferential surface of the outer tube 221 when the gas cutting apparatus 1 is used. Also, a space defined in the outer tube 221 is connected to the fuel gas supply hole 211.

The inner tube 222 is disposed in a space defined in the outer tube 221. A rear end of the inner tube 222 is coupled to the supply hole frame 21 and connected to an oxygen supply hole 213.

Thus, the handle part 22 has a kind of dual tube shape. When the fuel gas is introduced into the fuel gas supply hole 211, the fuel gas may flow through a fuel gas flow path 224 defined between an inner circumferential surface of the outer tube 221 and an outer circumferential surface of the inner tube 222, and oxygen introduced into the oxygen supply hole 213 may flow through an oxygen flow path 223 defined in the inner tube 222.

A front end of the handle part 22 is coupled to the valve frame 23.

As illustrated in FIG. 1, a flow path through which the oxygen introduced from the handle part 22 flows is defined in the valve frame 23. Also, a branch part 231 in which the oxygen introduced through the oxygen flow path 223 is divided into cutting oxygen and preheating oxygen is disposed in the valve frame 23.

Thus, the oxygen flowing into the valve frame 23 through the oxygen flow path 223 is divided at the branch part 231 to flow into the cutting oxygen tube 34 and the preheating oxygen tube 33.

A cutting oxygen adjusting vale 27 for adjusting an amount of cutting oxygen introduced into the cutting oxygen tube 34 is disposed on a portion at which the branch part 231 of the valve frame 23 is disposed. A preheating oxygen adjusting valve 26 for adjusting an amount of preheating oxygen introduced into the preheating oxygen tube 33 is disposed in a flow path defined in the valve frame 23.

Thus, each of the fuel gas adjusting valve 25, the preheating oxygen adjusting valve 26, and the cutting oxygen adjusting valve 27 may be adjusted to adjust an amount of each of preheating oxygen and cutting oxygen that respectively flow through preheating oxygen tube 33 and the cutting oxygen tube 34.

The fuel gas, the preheating oxygen, and the cutting oxygen may be introduced into the head frame 320 through the neck 31. This will be described with reference to FIGS. 3 to 8.

For reference, the valve bundle 2 may be exemplified as only one example. For example, the valve bundle 2 may change in structure as described above if the fuel gas, the preheating oxygen, and the cutting oxygen are separately supplied into the head frame 320.

Figure 3:
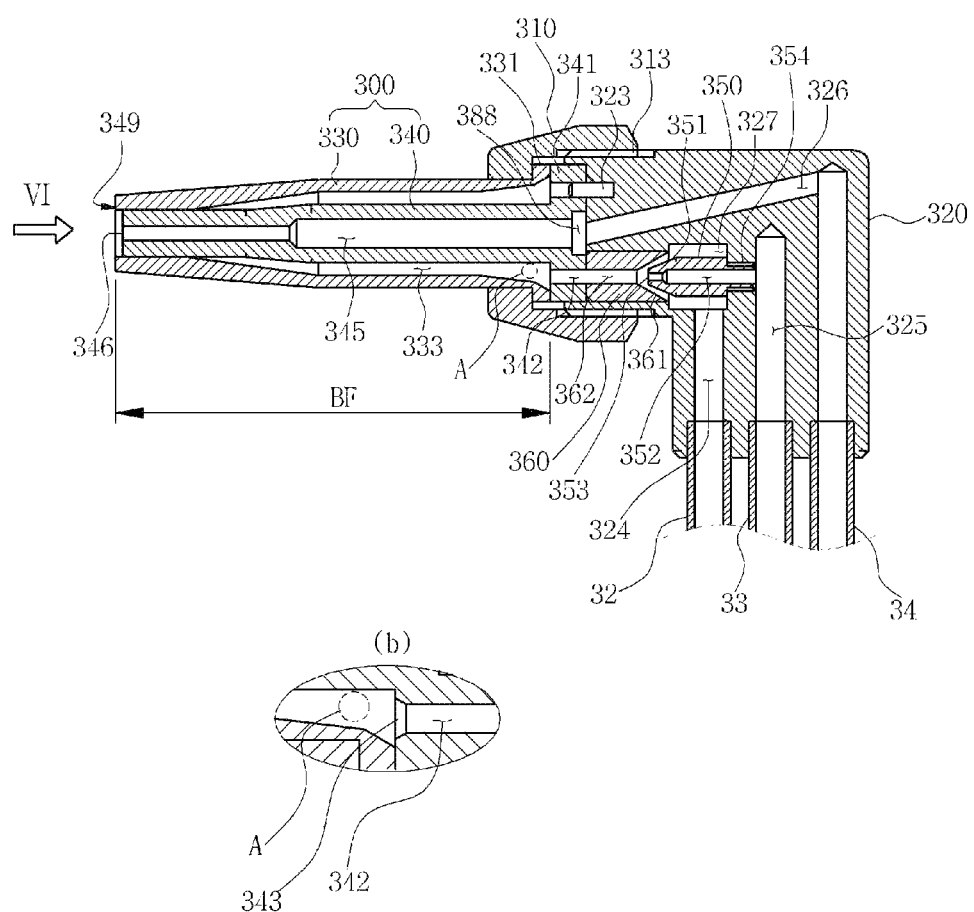
FIG. 3 is a cross-sectional view of a head of the backfire preventing gas cutting apparatus illustrated in FIG. 1.
Figure 4:
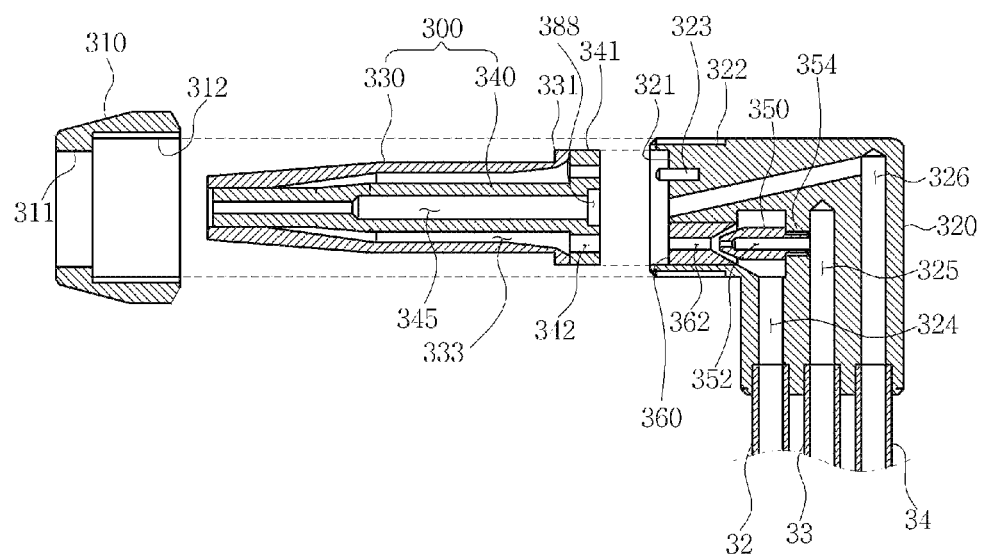
FIG. 4 is an exploded cross-sectional view of the head illustrated in FIG. 3.

FIG. 3 is a cross-sectional view of the head of the backfire preventing gas cutting apparatus illustrated in FIG. 1, and FIG. 4 is an exploded cross-sectional view of the head illustrated in FIG. 3. The description will be made with reference to FIGS. 3 and 4.

Referring to FIGS. 3 and 4, a fuel gas flow path 324, a preheating oxygen flow path 325, and a cutting oxygen flow path 326 which are respectively connected to the fuel gas tube 32, the preheating oxygen tube 33, and the cutting oxygen tube 34 are disposed within the head frame 320.

Thus, the fuel gas, the preheating oxygen, and the cutting oxygen which are respectively introduced into the fuel gas tube 32, the preheating oxygen tube 33, and the cutting oxygen tube 34 may flow through the fuel gas flow path 324, the preheating oxygen flow path 325, and the cutting oxygen flow path 326, respectively.

An insertion hole 311 passes through a coupling member (see reference numeral 310 of FIG. 3), and a screw thread part 312 is disposed on an inner circumferential surface of the insertion hole 311.

A screw thread part 322 is disposed on an outer circumferential surface of the front end of the head frame 320. The screw thread part 322 of the head frame 320 has a shape corresponding to that of the screw thread part 312 of the coupling member 310.

Thus, as illustrated in FIGS. 3 and 4, the coupling member 310 may be coupled to the head frame 320. Here, the rear end of the tip 300 may be seated into a seating groove 321 that is recessed in the front end of the head frame 320 and then be fixed by the coupling member 310. In this process, the screw thread part 312 of the coupling member 310 and the screw thread part 322 of the head frame 320 may be coupled to each other to form a coupling part 313.

As described above, when the tip 300 is coupled to the head frame 320 by the coupling member 310, the tip 300 passes through the insertion hole 311 to protrude in a direction of the front end of the coupling member 310.

The tip 300 includes an outer tip 330 and an inner tip 340. The inner tip 340 is disposed in a space defined within the outer tip 330. As described above, the inside of the tip 300 may have a dual tube shape in which the cutting oxygen flow path 345 and the mixed gas flow path 333 are defined.

A cutting oxygen inlet hole 388 connected to the cutting oxygen flow path and an injecting gas inlet hole connected to the injecting flow path are defined in the rear end of the tip.

Descriptions with respect to the above-described components will be described with reference to the related drawings, i.e., FIGS. 4, 9, 11 to 14, 19 to 20, 24 to 25, 29, and 31 to 32.

Figure 5:
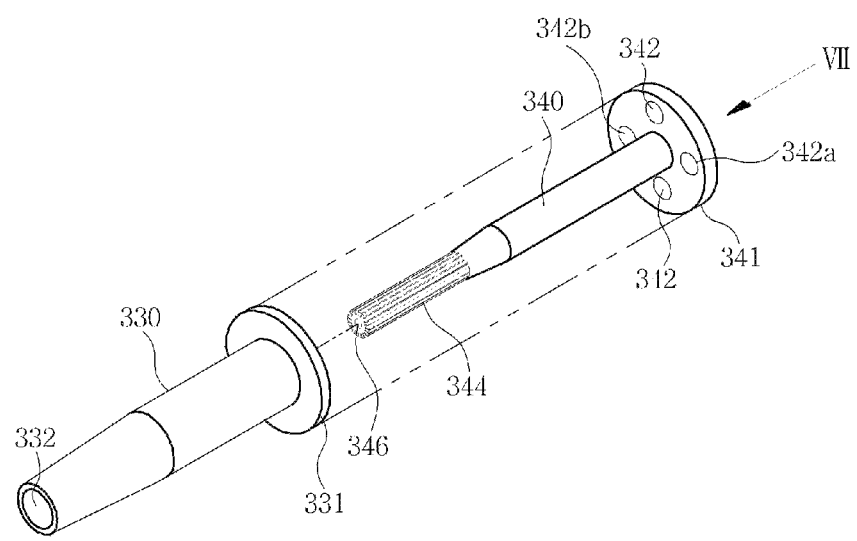
FIG. 5 is an exploded perspective view of a tip illustrated in FIG. 3.

FIG. 5 is an exploded perspective view of the tip illustrated in FIG. 3. The descriptions will be made with reference to FIG. 5.

Referring to FIG. 5, a flange part 331 having an expanded diameter is disposed on a rear end of the outer tip 330, and also, a flange part 341 having an expanded diameter is disposed on a rear end of the inner tip 340.

The flange part 341 of the inner tip 340 and the flange part 331 of the outer tip 330 may have outer diameters corresponding to each other. The flange part 341 of the inner tip 340 has a shape corresponding to that of the seating groove 321.

Thus, as illustrated in FIGS. 3 and 4, when the tip 300 is fixed to the head frame 320 by the coupling member 310, the flange part 341 of the inner tip 340 is seated in the seating groove 321, and the flange part 331 of the outer tip 330 is pressed by the coupling member 310 in a state where the flange part 331 overlaps the flange part 341 of the inner tip 340.

As illustrated in FIG. 5, each of the outer tip 330 and the inner tip 340 may have an outer diameter that gradually decreases in a direction of the front end thereof. The cutting oxygen flow path 345 that passes from the rear end to the front end is defined in the inner tip 340, and the front end of the cutting oxygen flow path 345 defines a cutting oxygen injecting hole 346.

A plurality of slits 344 that are radially disposed with respect to the cutting oxygen injecting hole 346 are defined in an outer circumferential surface of the portion at which the outer diameter of the inner tip 340 decreases. A through hole 332 is defined in the front end of the outer tip 330. When the inner tip 340 is inserted into the outer tip 330, the portion at which the outer diameter of the inner tip 340 decreases is inserted into the through hole 332 of the outer tip 330.

Here, the portion at which the outer diameter of the inner tip 340 decreases may correspond to an inner diameter of the through hole 332 of the outer tip 330.

An intermediate portion of the inner tip 340 may have an outer diameter less than an inner diameter of an intermediate portion of the outer tip 330. Thus, as illustrated in FIG. 3, when the inner tip 340 is inserted into the outer tip 330, a mixed gas flow path 333 is defined between the outer circumferential surface of the inner tip 340 and the inner circumferential surface of the outer tip 330.

A plurality of injecting gas inlet holes 342, 342a, and 342b pass through the flange part 341 of the inner tip 340. Here, when a rear end surface of the flange part 331 of the outer tip 330 contacts the flange part 341 of the inner tip 340, the front end of the inlet holes 342, 342a, and 342b may not be covered by the flange part 331 of the outer tip 330. Also, a rear end of the mixed gas flow path is connected to the injecting gas inlet holes 342, 342a, and 342b.

A mixing room A to which the front end of the injecting gas inlet holes 342, 342a, and 342b is connected is defined in a rear end of the mixed gas flow path 333. The mixing room A has a cross-sectional area that is greater than that of each of the injecting gas inlet holes 342, 342a, and 342b. Here, the mixing room A may not be separately defined with respect to the mixed gas flow path 333, but be defined as a portion of the rear end of the mixed gas flow path 333.

When the preheating oxygen and fuel gas introduced into the injecting gas inlet holes 342, 342a, and 342b are introduced into the mixing room A having a wide cross-sectional area, a flow rate may be reduced to generate an eddy. In this process, the preheating oxygen and the fuel gas may be mixed with each other to generate a combustible mixed gas.

Thus, when the cutting oxygen is supplied into the central portion of the rear end surface of the tip 300, the cutting oxygen is injected into the cutting oxygen injecting hole 346 via the cutting oxygen flow path 345. The preheating oxygen and fuel gas (i.e., the injecting gas) introduced into the injecting gas inlet holes 342, 342a, and 342b may generate the mixed gas via the mixing room A, and the mixed gas is injected into the through hole 332 through the slits 344 via the mixed gas flow path 333. This will be described with reference to FIG. 6.

Figure 6:
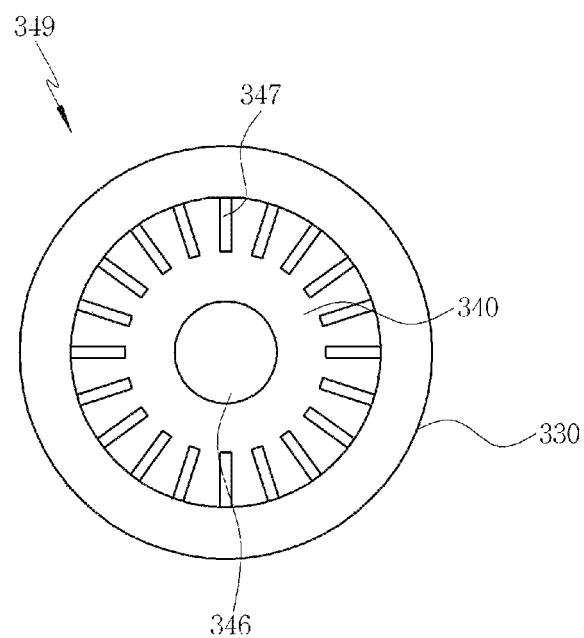
FIG. 6 is a view of a flame outlet in a VI direction in FIG. 3.

FIG. 6 is a view of the flame outlet in a VI direction in FIG. 3.

Referring to FIG. 6, the cutting oxygen injecting hole 346 and the mixed gas injecting hole 347 are defined in the flame outlet 349.

As described above, the cutting oxygen injecting hole 346 is defined in the central portion of the inner tip 340, and the mixed gas injecting hole 347 is radially defined around the cutting oxygen injecting hole 346.

Here, the mixed gas injecting hole 347 is defined by the slits (see reference numeral 344 of FIG. 5). When the mixed gas injected into the mixed gas injecting hole 347 is ignited to sufficiently heat the workpiece (not shown), and then, the cutting oxygen is injected through the cutting oxygen injecting hole 346, the workpiece (not shown) may be oxidized to cut the workpiece (not shown), Referring again to FIGS. 3 and 4, although the cross-sectional area of the mixed gas flow path 333 varies as necessary, the mixing room A may have the widest cross-sectional area and the gradually decrease in cross-sectional area toward the mixed gas injecting hole 347 according to an embodiment of the present invention.

This is done for injecting the mixed gas at a sufficient flow rate from the flame outlet 349 by increasing the flow rate because the cross-sectional area decreases as the mixed gas flows toward the mixed gas injecting hole 347 after the sufficient eddy is generated to improve the mixing rate while the preheating oxygen and fuel gas introduced from the injecting gas inlet holes 342, 342a, and 342b are introduced into the mixing room A having the wide cross-sectional area.

Figure 7:
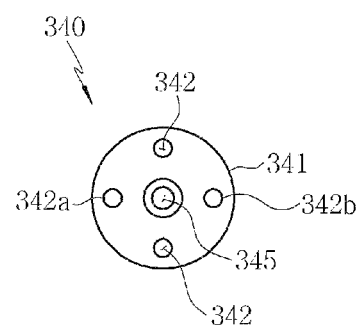
FIG. 7 is a view illustrating a rear end of an inner tip in a VII direction in FIG. 5.

FIG. 7 is a view of the rear end of the flame outlet in a VII direction in FIG. 5.

Referring to FIG. 7, the rear end of the cutting oxygen flow path 345 is disposed at the central portion of the rear end surface of the flange part 341 of the inner tip 340. Also, the injecting gas inlet holes 342, 342a, and 342b are defined in an edge of the rear end surface of the flange part 341 of the inner tip 340.

That is, as described above, to inject the cutting oxygen into the cutting oxygen injecting hole 346 and the mixed gas into the mixed gas injecting hole 347, the cutting oxygen has to be supplied into the cutting oxygen flow path 345, and the preheating oxygen and fuel gas have to be introduced into the injecting gas inlet holes 342, 342a, and 342b.

Thus, the seating groove (see reference numeral 321 of FIG. 4) defined in the front end of the head frame 420 coupled to the rear end surface of the flange part 341 of the inner tip 340 may also have the corresponding shape. This will be described with reference to FIG. 8.

Figure 8:
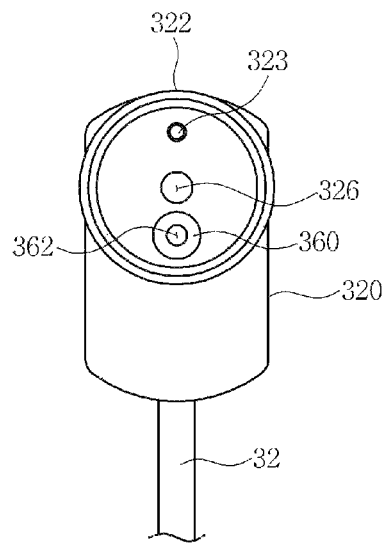
FIG. 8 is a view of a front end of a head frame illustrated in FIG. 3.

FIG. 8 is a view of the front end of the head frame illustrated in FIG. 3.

Referring to FIG. 8, the front end of the cutting oxygen flow path 326 is disposed at a central portion of the seating groove (see reference numeral 321 of FIG. 4) defined in the front end of the head frame 320, and front ends of a fixing pin 323 and the injecting flow path 362 are defined therearound. Here, the injecting flow path 362 is defined in a central portion of an injecting cap 360. This will be described again below.

Thus, when the rear end surface of the inner tip 340 that is described with reference to FIG. 7 is fixed to the seating groove 321 of the head frame 350, the cutting oxygen flow path 345 defined in the central portion of the inner tip 340 and the cutting oxygen flow path 326 defined in the head frame 320 are connected to each other. That is, the cutting oxygen introduced into the head frame 320 to flow through the cutting oxygen flow path 326 is injected into the cutting oxygen injecting hole (see reference numeral 346 of FIG. 6) via the cutting oxygen flow path 345 of the inner tip 340.

Also, the preheating oxygen and fuel gas flowing through the injecting flow path 362 are introduced into one of the injecting gas inlet holes 342, 342a, and 342b and then injected into the mixed gas injecting hole (see reference numeral 347 of FIG. 6).

When the rear end surface of the inner tip 340 is seated in the seating groove (see reference numeral 321 of FIG. 4), the fixing pin 323 may be configured to one of the injecting flow path 362 and the injecting gas inlet holes 342, 342a, and 342b may be easily aligned. As illustrated in FIG. 7, when an end of the fixing pin 323 is inserted into one of the plurality of injecting gas inlet holes 342, 342a, and 342b, the other one of the plurality of injecting gas inlet holes 342, 342a, and 342b may be connected to the injecting flow path 362.

Here, the fixing pin 323 may have a diameter corresponding to an inner diameter of the injecting gas inlet hole 342 to prevent the mixed gas from leaking into the injecting gas inlet hole 342 into which the fixing pin 323 is inserted. Also, one of the plurality of injecting gas inlet holes 342, 342a, and 342b, into which the fixing pin 323 is inserted, or which is not connected to the injecting flow path 362, may contact the seating groove (see reference numeral 321 of FIG. 4) to seal the seating groove.

For reference, although four injecting gas inlet holes 342, 342a, and 342b are defined in an embodiment of the present invention, as described above, the number of injecting gas inlet holes 342, 342a, and 342b may increase or decrease to easily connect the injecting gas inlet hole 342 to the injecting flow path 362.

An inner structure of the head frame 320 will be described with reference to FIGS. 3 and 4.

The injecting part in which the fuel gas and preheating oxygen laminar flow is disposed within the head frame 320. The injecting part is formed by a fuel gas chamber 327 defined in an end of the fuel gas flow path 324, an injecting core 350 disposed within the fuel gas chamber 327, and an injecting cap 360.

The injecting core 350 has an outer circumferential surface having a cylindrical shape. A preheating oxygen flow path 352 is defined in a central portion of the injecting core 350 along a longitudinal direction. The preheating oxygen flow path 352 passes from a front end to a rear end of the injecting core 350 and is connected to a preheating oxygen injecting hole 353 defined in the front end of the injecting core 350. The preheating oxygen injecting hole 353 may have a diameter less than that of the preheating oxygen flow path 352. The diameter and effect of the preheating oxygen injecting hole 353 will be described below.

A tapered surface 351 is disposed outside the front end of the injecting core 350. The tapered surface 351 may be formed so that the injecting core 350 has an outer diameter that gradually decreases toward the front end of the injecting core 350.

A screw thread (not shown) is disposed on the rear end of the injecting core 350. As described above, the portion on which the screw thread is disposed may be coupled between the fuel gas flow path 324 and the preheating oxygen flow path 325 of the head frame 320 to form a coupling part 354. That is, the injecting core 350 is coupled to an inner circumferential surface of a through hole defined in a shape in which the fuel gas flow path 324 and the preheating oxygen flow path 325 of the head frame 320 are connected to each other.

As described above, the injecting cap 360 is disposed to be spaced at a front side of the front end on which the tapered surface 351 of the injecting core 350 is disposed.

The injecting cap 360 may have a shape corresponding to that of the tapered surface 351 disposed on the front end of the head frame 320. That is, the tapered surface 361 is disposed on the rear end of the injecting cap 360, and the tapered surface 361 has a shape that is recessed in a direction of the front end of the tapered surface 361.

Thus, the injecting core 350 and the injecting cap 360 may be disposed in a shape in which a portion of the injecting core 350 on which the tapered surface 351 is disposed is inserted into the portion on which the tapered surface 361 of the injecting cap 360 is disposed.

The injecting flow path 362 that passes from the front end to the rear end in a longitudinal direction thereof is defined in a central portion of the injecting cap 360. As described with reference to FIG. 8, the front end of the injecting flow path 362 is disposed within the seating groove 321 of the head frame 320, and the rear end of the injecting flow path 362 is disposed in parallel to the preheating oxygen injecting hole 353 of the injecting core 350.

The injecting cap 360 may be coupled to the head frame 320 in a manner in which the injecting cap 360 is inserted into the through hole defined in the seating groove 321 of the head frame 320. Here, although not shown, the injecting cap 360 may be coupled to the head frame 320 through welding.

As described above, the injecting core 350 and the injecting cap 360 are disposed to be spaced apart from each other. Thus, a gap is defined between the tapered surface 351 of the injecting core 350 and the tapered surface 361 of the injecting cap 360. The gap may communicate with the fuel gas chamber 327.

A second preheating oxygen flow path 352 defined in the central portion of the injecting core 350 is connected to a first preheating oxygen flow path 325 defined in the head frame 320 at the rear end of the injecting core 350. Thus, the preheating oxygen introduced through the first preheating oxygen flow path 325 is introduced into the rear end of the injecting core 350 and then injected into the preheating oxygen injecting hole 353 via the second preheating oxygen flow path 352. The preheating oxygen injected into the preheating oxygen injecting hole 353 is introduced into the injecting cap 360.

Here, the preheating oxygen injecting hole 353 defined in the injecting core 350 has an inner diameter less than that of the second preheating oxygen flow path 352. This is done for increasing a flow rate of the preheating oxygen injected through the preheating oxygen injecting hole 353 to increase the suction of the fuel gas between the two tapered surfaces 351 and 361.

That is, as described above, since an inner diameter of a tube through which the preheating oxygen flows (the preheating oxygen tube→the preheating oxygen flow path having a different diameter→the preheating oxygen injecting hole) gradually decreases, a low pressure may be generated in the gap between the tapered surface 351 of the injecting core 350 and the tapered surface 361 of the injecting cap 360 by the preheating oxygen that is injected from the preheating oxygen injecting hole 353 at a high rate to flow into the injecting flow path 362. Thus, the fuel gas introduced into the fuel gas chamber 327 via the fuel gas flow path 324 flows to form a layer together with the preheating oxygen via the two tapered surfaces 351 and 361 without being mixed within the injecting flow path 362.

Thus, as described below, the preheating oxygen flowing at the high flow rate may laminar flow without being mixed with the fuel gas.

The above description may correspond to a basic operation of the laminar flow in an embodiment of the present invention.

As described above, the fuel gas chamber 327 is spaced from the portion, on which the tapered surface 351 is not disposed, of the outer circumferential surface of the injecting core 350 to surround a portion of the injecting core 350. The fuel gas chamber 327 may have a volume that is enough to allow an adequate amount of fuel gas to be mixed with the mixed gas in consideration of the flame power that is required in the flame outlet (see reference numeral 349 of FIG. 6).

That is, the volume of the fuel gas chamber 327 may increase or decrease as necessary. Thus, the cutting oxygen flow path 326 may vary in shape. This will be described with reference to FIG. 9.

As described above, the preheating oxygen and fuel oxygen introduced into the injecting flow path 362 may laminar flow while passing through the injecting flow path 362 and the injecting gas inlet hole 342 connected to the injecting flow path 362.

As one example in this specification, the "laminar flow" may be called a flow in which the preheating oxygen flows into the central portion, and the fuel gas flows into the edge portion while the preheating oxygen and the fuel gas flow through a tube defined by the injecting flow path 362 and the injecting gas inlet hole 342 to form a layer without being mixed with each other.

The above-described content will be additionally described.

Since an inner diameter of a tube through which the preheating oxygen flows (the preheating oxygen tube→the preheating oxygen flow path having a different diameter-→the preheating oxygen injecting hole) gradually decreases, a low pressure may be generated in the gap between the tapered surface 351 of the injecting core 350 and the tapered surface 361 of the injecting cap 360 by the preheating oxygen that is injected from the preheating oxygen injecting hole 353 at a high rate to flow into the injecting flow path 362. Thus, the fuel gas introduced into the fuel gas chamber 327 via the fuel gas flow path 324 flows to form a layer together with the preheating oxygen via the two tapered surfaces 351 and 361 without being mixed within the injecting flow path 362. Alternatively, some mixing may occur.

The laminar flow as described above may be significantly reduced in flow rate to form an eddy and then mixed with each other when the preheating oxygen and fuel gas which laminar flow reach the mixing room A while being introduced into the mixed gas flow path 333 via the injecting gas inlet hole 342. Here, the more a difference between the cross-sectional area of the injecting gas inlet hole 342 and the cross-sectional area of the mixing room A increases, the more an occurrence of the eddy increases. Thus, the mixed rate of the preheating oxygen and the fuel gas may increase to improve thermal efficiency of the mixed gas injected into the mixed gas injecting hole (see reference numeral 347 of FIG. 6).

Thus, as described above, in the backfire preventing gas cutting apparatus (see reference numeral 1 of FIG. 1) according to an embodiment of the present invention, the injecting part is disposed within the head frame 320, the flame may not be introduced into the injecting gas inlet hole 342 even though the backfire occurs in use to reach the mixing room A, i.e., the flame may reach a region that is expressed by BF in FIG. 3. Thus, possibility of explosion due to the backfire and overheating of the head frame 320 may be very low.

For reference, although partial mixing occurs to generate a small amount of mixed gas at a boundary between the preheating oxygen and the fuel gas, which laminar flow, when the backfire occurs by using only the small amount of mixed gas, flammability that is enough to be introduced into the injecting gas inlet hole 342 may not occur.

That is, in this specification, the "laminar flow" may be called a phenomenon in which the sufficient flammability does not occur even though the preheating oxygen and the fuel gas are partially mixed with each other while flowing to flow while maintaining a layer so that the flame is not introduced into the injecting gas inlet hole 342.

For this, each of the injecting flow path 362 and the injecting gas inlet hole 342 may have a length that is enough to maintain the laminar flow. As illustrated in the drawings, the injecting core 350 in which the preheating oxygen flow path 352 is defined, the injecting flow path 362, the injecting gas inlet hole 342, and the mixing room A may be disposed in a line.

As necessary, a diffuser (see reference numeral 343 of FIG. 3B) having a diameter that gradually increases in the direction of the flame outlet (see reference numeral 349 of FIG. 3) may be disposed at the front end of the injecting gas inlet hole 342, i.e., a portion contacting the mixing room A of the injecting gas inlet hole 342 to adjust a degree of the generation of the eddy while the preheating oxygen and the fuel gas are introduced into the mixing room A.

In the backfire preventing gas cutting apparatus 1 according to an embodiment of the present invention, the fuel gas within the fuel gas chamber 327 may be suctioned into the injecting flow path 362 by the high-rate injection of the preheating oxygen having a pressure higher than that of the fuel gas to laminar flow. Thus, unlike a method in which the flame power depends on a supply pressure of the fuel gas, the fuel gas may be stably supplied to maintain uniform flame power.

As described above, the head frame 320 does not require a separate sealing member for preventing the preheating oxygen and the cutting oxygen from being mixed with each other. That is, since the arbitrary mixing of the preheating oxygen and the cutting oxygen is prevented without using the sealing member formed of an elastic material, the mixing of the fuel gas, the preheating oxygen, and the cutting oxygen by damage of the sealing member due to the degradation by the heating of the head frame 320 may not occur.

Figure 9:
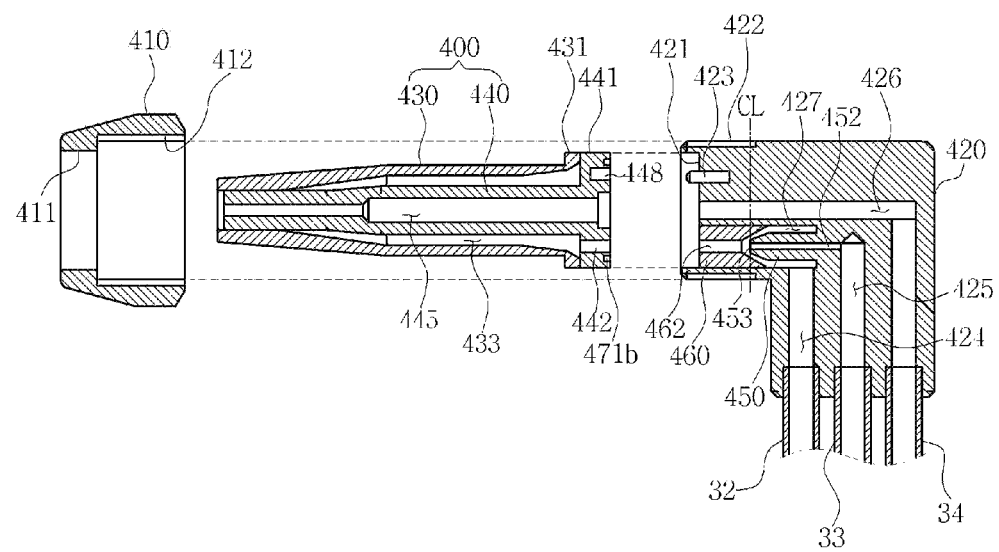
FIG. 9 is an exploded cross-sectional view of a head part of a backfire preventing gas cutting apparatus according to another embodiment of the present invention.

FIG. 9 is an exploded cross-sectional view of a heat part of a backfire preventing gas cutting apparatus according to another embodiment of the present invention.

Referring to FIGS. 9 and 4, a fuel gas flow path 424, a preheating oxygen flow path 425, and a cutting oxygen flow path 426 which are respectively connected to a fuel gas tube 32, a preheating oxygen tube 33, and a cutting oxygen tube 34 are disposed within a head frame 420 of a backfire preventing gas cutting apparatus (not shown) according to another embodiment of the present invention.

Here, a valve bundle (not shown) including the fuel gas tube 32, the preheating oxygen tube 33, and the cutting oxygen tube 34 has the same structure as the valve bundle 2 that is described with reference to FIGS. 1 and 2, and thus, its description will be omitted.

Fuel oxygen, preheating oxygen, and cutting oxygen which are respectively introduced into the fuel gas tube 32, the preheating oxygen tube 33, and the cutting oxygen tube 34 may flow through the fuel gas flow path 424, the preheating oxygen flow path 425, and the cutting oxygen flow path 426, respectively.

An insertion hole 411 passes through a coupling member 410, and a screw thread part 412 is disposed on an inner circumferential surface of the insertion hole 411. A screw thread part 422 is disposed on an outer circumferential surface of a front end of a head frame 420. The screw thread part 422 of the head frame 420 has a shape corresponding to that of a screw thread part 412 of the coupling member 410.

A tip 400 includes an outer tip 430 and an inner tip 440. The inner tip 440 is disposed in a space defined within the outer tip 430. As described above, the inside of the tip 400 may have a dual tube shape in which a cutting oxygen flow path 445 and a mixed gas flow path 433 are defined.

A flange part 431 disposed on the outer tip 430, a flange part 441 disposed on the inner tip 440, and an injecting gas inlet hole 442 have the same structure and operation as the flange part 331 of the outer tip 330, the flange part 341 of the inner tip 340, and the injecting gas inlet hole 342 which are described with reference to FIGS. 1 to 8, and the coupling member 410 and the head frame 420 may have the same coupling structure as the above-described coupling member 310 and the head frame 320. Thus, their descriptions will be derived from the description described according to an embodiment of the prevent invention.

However, another embodiment of the prevent invention is different from the foregoing embodiment of the present invention in that a pin insertion hole 448 and a cooling flow path 471b are provided in the flange part 441 of the inner tip 440. This will be described below with reference to FIG. 10.

A seating groove 421 in which a rear end of the inner tip 440 is defined at a front end of the head frame 420 on which a screw thread part 422 is disposed. A front end of the cutting oxygen flow path 426 is disposed at a central portion of the seating groove 421. When the tip 400 is coupled to the head frame 420, cutting oxygen leaking into the cutting oxygen flow path 426 may be introduced into a rear end of the cutting oxygen flow path 445 defined in an inner central portion of the tip 400 to flow in a direction of the front end.

A flame outlet (not shown) is defined in the front end of the tip 400. The flame outlet defined in the front end of the tip 400 has the same structure as the flame outlet 340 of FIG. 6, and thus, its description will be omitted.

Thus, the cutting oxygen flowing up to the front end of the cutting oxygen flow path 445 is injected into a cutting oxygen injecting hole (see reference numeral 346 of FIG. 6) of the flame outlet defined in the front end of the tip 400. The cutting oxygen injecting hole of the tip 400 is disposed in a central portion of the flame outlet.

A plurality of mixed gas injecting holes (not shown, see reference numeral 347 of FIG. 6) are radially defined around the cutting oxygen injecting hole (not shown) defined in the central portion of the flame outlet of the tip 400. A mixed gas flowing through a mixed gas flow path 433 is injected into the mixed gas injecting holes.

As described above, a gas has to be introduced into the injecting gas inlet hole 442 to inject the mixed gas into the mixed gas injecting holes defined in the flame outlet that is defined in the front end of the tip 400. Thus, when the flange part 431 is seated into the seating groove 421, an injecting flow path 462 may be defined in the seating groove 421 of the head frame 420 coupled to a rear end surface of the flange part 441 of the inner tip 440 at a position corresponding to the rear end of the injecting gas inlet hole 442.

As illustrated in FIG. 9, the injecting flow path 462 may have a shape that passes through a central portion of an injecting cap 460 disposed on a front end of the seating groove 421 of the frame 420. Since the injecting cap 460 has the same shape as the injecting cap 360 described with reference to FIGS. 3, 4, and 8, description with respect to the shape of the injecting cap 460 will be omitted. Here, the injecting part disposed within the head frame 420 includes the injecting cap 460.

The injecting part is disposed within the head frame 420. The injecting part is defined by a fuel gas chamber 427 defined in an end of the fuel gas flow path 424, an injecting core 450 disposed within the fuel gas chamber 427, and the injecting cap 460.

The injecting core 450 has an outer circumferential surface having a cylindrical shape. As described above, a preheating oxygen flow path 452 is defined in a central portion of the injecting core 450 along a longitudinal direction. The preheating oxygen flow path 452 passes from a front end to a rear end of the injecting core 450. When the flange part 441 is seated into the seating groove 421, a front end of the preheating oxygen flow path 452 is connected to the injecting gas inlet hole 442.

A tapered surface is disposed outside the front end of the injecting core 450. Since the tapered surface has the same shape as the tapered surface 351 described with reference to FIGS. 3 and 4, descriptions with respect to the shape of the tapered surface 351 will be derived from that of the tapered surface 351, which is described with reference to FIGS. 3 and 4.

The rear end of the injecting core 450 is disposed between the fuel gas flow path 424 and the preheating oxygen flow path 425 which are defined in the head frame 420. That is, the injecting core 450 is disposed to connect the fuel gas flow path 424 and the preheating oxygen flow path 425 of the head frame 420 to each other. Also, the injecting core 450 is integrated with the head frame 420.

As described above, the above-described injecting cap 460 is disposed to be spaced at a front side of the front end of the injecting core 450 on which the tapered surface is disposed. A tapered surface is disposed on a rear end of the injecting cap 460. The tapered surface may correspond to the tapered surface disposed on the front end of the injecting core 450 and be recessed in a direction of the front end. A central portion of the tapered surface having the recessed shape of the injecting cap 460 is connected to a rear end of the injecting flow path 462.

Thus, the injecting core 450 and the injecting cap 460 may be disposed in a shape in which a portion of the injecting core 450 on which the tapered surface is disposed is inserted into the portion on which the tapered surface of the injecting cap 460 is disposed.

The injecting cap 460 may be coupled to the head frame 420 in a manner in which the injecting cap 460 is inserted into a through hole defined in the seating groove 421 of the head frame 420. Here, the injecting cap 460 may be integrated with the head frame 420.

When the injecting cap 460 is integrated with the head frame 420, the front end and the rear end of the head frame 420 may be manufactured with respect to a portion that is expressed as CL in the drawing and then welded to each other to couple the injecting cap 460 to the head frame 420. Thus, the head frame 420 may be very easily manufactured.

Also, the head frame 420 does not require a separate sealing member for preventing the preheating oxygen and the cutting oxygen from being mixed with each other. That is, even though the head frame 420 is heated in use, arbitrary mixing of the fuel gas, the preheating oxygen, and the cutting oxygen may not occur.

Like the fuel gas chamber 327 described with reference to FIGS. 3 and 4, the fuel gas chamber 427 may provide a space into which the fuel gas is introduced into the injecting flow path 462 together with the preheating oxygen at a low pressure generated by the flow of the preheating oxygen injected at a high rate through the injecting flow path 462 to laminar flow.

The fuel gas chamber 427 according to the current embodiment has a volume less than that of the fuel gas chamber (see reference numeral 327 of FIG. 3) according to the first embodiment (see reference numeral 1 of FIG. 1) of the present invention. This may be an example in which the fuel gas having an adequate amount is capable of being mixed with the mixed gas in consideration of flame power that is required in the flame outlet (not shown) defined in the tip 400.

As described above, the volume of the fuel gas chamber 427 may increase or decrease as necessary. Thus, the cutting oxygen flow path 426 may have a shape different from that of the cutting oxygen flow path (see reference numeral 327 of FIG. 3) according to the first embodiment of the present invention. That is, the shape of the cutting oxygen flow path 426 may adequately vary according to the volume of the fuel gas chamber 427 as necessary.

A fixing pin 423 is configured to easily align the injecting flow path 462 with the injecting gas inlet hole 442 when the rear end surface of the inner tip 440 is seated into the seating groove 421.

That is, when the rear end surface of the flange part 441 is seated into the seating groove 421, a front end of the fixing pin 423 is inserted into a pin insertion hole 448 defined in the flange part 441. When the fixing pin 423 is inserted into the pin insertion hole 448, the front end of the cutting oxygen flow path 426 of the head frame 420 is connected to the rear end of the cutting oxygen flow path 445 of the tip 400, and the front end of the injecting flow path 462 is connected to the injecting gas inlet hole 442.

For reference, unlike the above-described structure, when the injecting flow path 462 and the fixing pin 423 are symmetrical to each other with respect to a center of the cutting oxygen flow path 426, the fixing pin 423 may be disposed in the pin insertion hole 448 and one injecting gas inlet hole 442 or one of the plurality of injecting gas inlet holes (not shown) or in a position corresponding thereto. Thus, when the fixing pin 423 is inserted into the pin insertion hole 448, one injecting gas inlet hole 442 or one of the plurality of injecting gas inlet holes (not shown) may be connected to the injecting flow path 462.

Thus, when a worker couples the tip 400 to the head frame 420, the fixing pin 423 may be inserted into the pin insertion hole 448, and the tip 400 and the head frame 420 may be coupled at fixed positions, thereby improving convenience in work.

Figure 10:
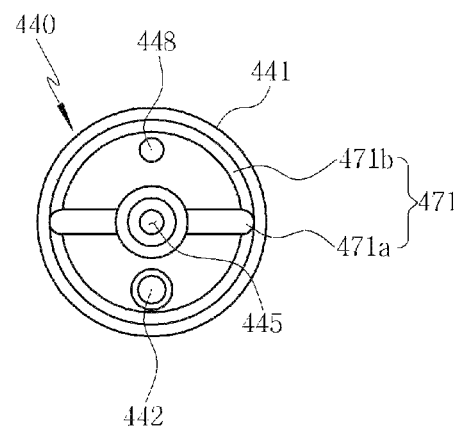
FIG. 10 is a view of a rear end of a tip illustrated in FIG. 9.

FIG. 10 is a view of the front end of the tip illustrated in FIG. 9. The description will be made with reference to FIG. 9.

Referring to FIGS. 9 and 10, a cooling flow path 471 is defined in the rear end surface of the tip 400, i.e., the rear end surface of the flange part 441. The cooling flow path 471 has a groove shape into which the cutting oxygen introduced into the cutting oxygen flow path 445 of the tip 400 flows through the cutting oxygen flow path 426 of the head frame 420.

The cutting oxygen flow path 445 includes a linear cooling flow path 471a and a curved cooling flow path 471b. Here, the linear cooling flow path 471a may be radially defined from the cutting oxygen flow path 445 defined in the central portion of the flange part 441 in an edge direction of the flange part 441. Also, the curved cooling flow path 471b is defined along an edge of the rear end surface of the flange part 441. As illustrated in the drawings, the curved cooling flow path 471b may have a shape that connects ends of the linear cooling flow path 471a to each other.

Thus, while the cutting oxygen is introduced from the cutting oxygen flow path 426 of the head frame 420 into the cutting oxygen flow path 445 of the tip 400, a portion of the cutting oxygen may flow along the linear cooling flow path 471a and the curved cooling flow path 471b.

Here, since the cutting oxygen has a low temperature, when the cutting oxygen flows along the cooling flow path 471, the rear end surface of the tip 400 and the front end of the head frame 420 which contact the cutting oxygen may be cooled. That is, even though the tip 400 is heated by the cutting process or the backfire, heat conducted through the tip 400 may be cooled by the cutting oxygen flowing through the cooling flow path 471 to significantly reduce the heat transferred into the head frame 420.

Thus, since the heating of the head frame 420 is prevented during the process, an increase in temperature of the tip 400, the head frame 420, the fuel gas tube 32, the preheating oxygen tube 33, and the cutting oxygen tube 34 due to the heating may be restricted.

In recent, each of the fuel gas tube 32, the preheating oxygen tube 33, and the cutting oxygen tube 34 is formed of a copper alloy to prevent the fuel gas tube 32, the preheating oxygen tube 33, and the cutting oxygen tube 34 from being oxidized by the heating. As described above, since the oxidization of the tubes due to the cooling of the cooling flow path 471 is prevented, each of the fuel gas tube 32, the preheating oxygen tube 33, and the cutting oxygen tube 34 may be formed of a material that is cheap, has superior mechanical strength, and lightweight when compared to the copper alloy.

Figure 11:
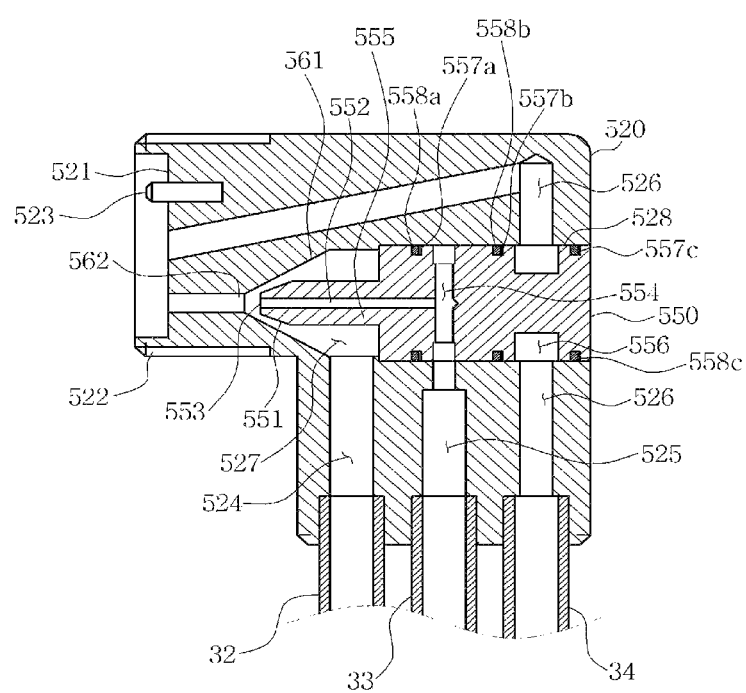
FIG. 11 is a cross-sectional view of a head frame of a backfire preventing gas cutting apparatus according to another embodiment of the present invention.

FIG. 11 is an exploded cross-sectional view of a head frame of a backfire preventing gas cutting apparatus according to another embodiment of the present invention.

Referring to FIG. 11, a fuel gas flow path 524, a preheating oxygen flow path 525, and a cutting oxygen flow path 526 which are respectively connected to a fuel gas tube 32, a preheating oxygen tube 33, and a cutting oxygen tube 34 are disposed within a head frame 520 of a backfire preventing gas cutting apparatus (not shown) according to another embodiment of the present invention.

Here, a valve bundle (not shown) of the backfire preventing gas cutting apparatus according to another embodiment of the present invention includes the fuel gas tube 32, the preheating oxygen tube 33, and the cutting oxygen tube 34. The valve bundle has the same structure as the valve bundle 2 that is described with reference to FIGS. 1 and 2, and thus, its description will be omitted.

Furthermore, since one of the above-described tips (see reference numeral 300 of FIG. 3 and reference numeral 400 of FIG. 9) is applied to the backfire preventing gas cutting apparatus (not shown) according to another embodiment of the prevent invention, its description will be omitted.

A distributor insertion hole 528 passing through a portion of the head frame 520 from a rear end to a front end while connecting the fuel gas flow path 524, the preheating oxygen flow path 525, and the cutting oxygen flow path 526 to each other is disposed in the head frame 520. A distributor is inserted into and coupled to the distributor insertion hole 528. The distributor includes a distributor body 550.

The distributor body 550 has a cylindrical shape. A cutting oxygen bypass groove 556 is defined in an outer circumferential surface of the distributor body 550. The cutting oxygen bypass groove 556 may be recessed from the outer circumferential surface of the distributor body 550. When the distributor body 550 is inserted into the distributor insertion hole 528, the cutting oxygen bypass groove 556 may be defined in a position corresponding to the cutting oxygen flow path 526 on the outer circumferential surface of the distributor body 550.

Thus, since a portion of the cutting oxygen flow path 526, which is blocked by the distributor body 550 coupled to the distributor insertion hole 528 is connected to the cutting oxygen bypass groove 556, the cutting oxygen introduced into the cutting oxygen tube 34 may flow up to the front end of the cutting oxygen flow path 526 through the cutting oxygen bypass groove 556.

An injecting core part 555 is disposed on a front end of the distributor body 550. A tapered surface 551 having an outer diameter that gradually decreases in a direction of the front end of the distributor body 550 is disposed on an outer circumferential surface of the injecting core part 555.

A preheating oxygen inlet hole 554 may be defined in a front direction than a portion of the distributor body 550 in which the cutting oxygen bypass groove 556 is defined and in a rear direction than a portion on which the tapered surface 551 is disposed.

The preheating oxygen inlet hole 554 may be provided in plurality that are radially defined from the outer circumferential surface of the distributor body 550 in a central direction. Here, as illustrated in FIG. 11, when the distributor body 550 is inserted into the distributor insertion hole 528, the preheating oxygen inlet hole 554 may be defined in a position corresponding to the preheating oxygen flow path 525 on the outer circumferential surface of the distributor body 550.

A preheating oxygen flow path 552 is defined in a central portion of the injecting core part 555. The preheating oxygen flow path 552 is connected to the preheating oxygen inlet hole 554 from the front end of the distributor body 550 along the center of the distributor body 550. On the other hand, the preheating oxygen flow path 552 is connected from a portion of the preheating oxygen inlet hole defined in the central portion of the distributor body 550 to the front end of the distributor body 550.

Thus, the preheating oxygen introduced into the preheating oxygen inlet hole 554 is injected into the front end of the distributor body 550 via the preheating oxygen flow path 552.

An injecting cap part 561 having a shape corresponding to that of the injecting core part 555 and spaced apart in the front direction of the injecting core part 555 is disposed on the head frame 520. An injecting flow path 562 is defined in a central portion of the injecting cap part 561. A tapered surface having a shape that is recessed to the front end of the head frame toward the central portion to correspond to the shape of the tapered surface 551 of the injecting core part 55 is disposed around the injecting flow path 562.

A fuel gas chamber 527 connected to the fuel gas flow path 524 is defined around the injecting core part 55. The fuel gas introduced through the fuel gas tube 32 is introduced into the fuel gas chamber 527 via the fuel gas flow path 524.

Thus, the preheating oxygen injected into the preheating oxygen injecting hole 553 defined in the front end of the injecting core part 555 is introduced into the injecting flow path 562. Thus, a pressure around the tapered surface 551 may be relatively lowered. Thus, the fuel gas within the fuel gas chamber 527 is introduced into the injecting flow path 562 together with the preheating oxygen, and the fuel gas and preheating oxygen may laminar flow in the injecting flow path 562.

The rear end of the above-described tip (see reference numeral 300 of FIG. 3 or 400 of FIG. 9) is seated into the seating groove 521 defined in the front end of the head frame 520. Also, the above-described coupling member (see reference numeral 310 of FIG. 3 or 410 of FIG. 9) may be coupled to the front end of the head frame 520, and thus the tip (300 or 400) and the head frame 520 may be fixed.

As described above, the injecting part may be defined within the head frame 520 by the injecting core part 55, the injecting cap part 561, and the fuel gas chamber 527 in another embodiment of the present invention.

At least one of a portion of the outer circumferential surface of the distributor body 560 between the tapered surface 551 and the preheating oxygen inlet hole 554, a portion between the preheating oxygen inlet hole 554 and the cutting oxygen bypass groove 556, and a portion between the cutting oxygen bypass groove 556 and the rear end of the distributor body 550 may be welded and coupled to the inner circumferential surface of the distributor insertion hole 528.

Here, the above-described welded coupling may be realized by forming welding grooves 557a, 557b, and 557c in the portion of the outer circumferential surface of the distributor body 560 between the tapered surface 551 and the preheating oxygen inlet hole 554, the portion between the preheating oxygen inlet hole 554 and the cutting oxygen bypass groove 556, and the portion between the cutting oxygen bypass groove 556 and the rear end of the distributor body 550 to accommodate a welding rod (not shown) having a ring shape or a welding material (not shown) having a powder state into the welding grooves 557a, 557b, and 557c and then heating the welding grooves 557a, 557b, and 557c to fuse the welding rod (not shown) or the welding material (not shown).

The welding method may be realized through ultrasonic welding or brazing.

The arbitrary mixing of the fuel gas, the preheating oxygen, and the cutting oxygen within the head frame 520 may be prevented by the welded parts 558a, 558b, and 558c that are provided through the above-described process. Also, even though the head frame 520 is heated by the heat conducted from the tip (see reference numeral 300 of FIG. 3), the damage due to the degradation of the above-described sealing member may not occur. Thus, the head frame 520 may be used semipermanently.

Particularly, since the head frame 520 is easily manufactured, the cost required for manufacturing the head frame 520 may be reduced.

For reference, since the fixing pin 523 is equal to the fixing pin 423 that is described with reference to FIG. 9, its description will be omitted.

Figure 12:
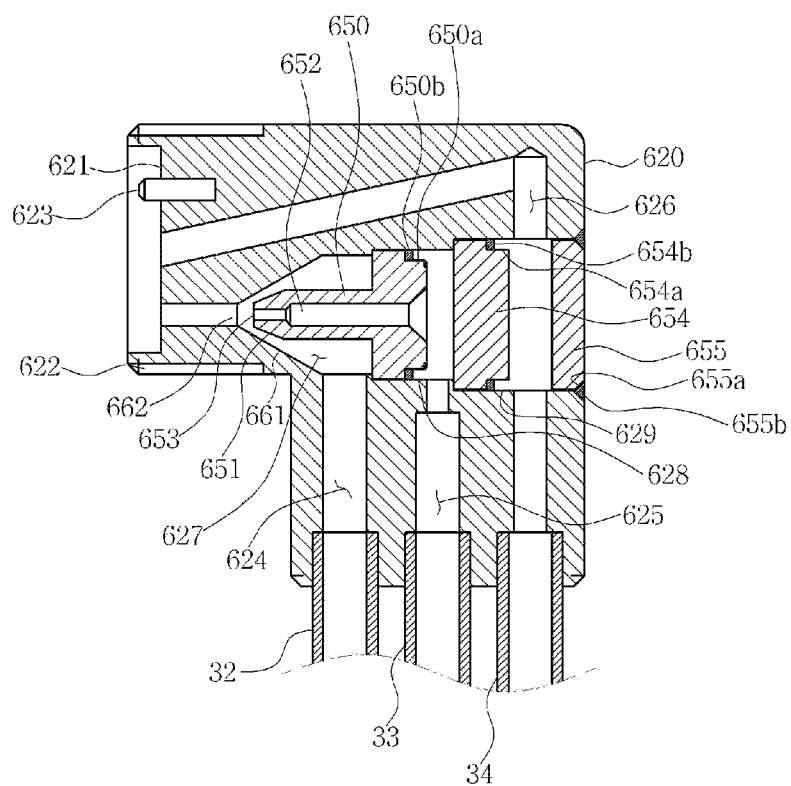
FIG. 12 is a cross-sectional view of a head frame of a backfire preventing gas cutting apparatus according to further another embodiment of the present invention.

FIG. 12 is an exploded cross-sectional view of a head frame of a backfire preventing gas cutting apparatus according to another embodiment of the present invention.

Referring to FIG. 12, a fuel gas flow path 624, a preheating oxygen flow path 625, and a cutting oxygen flow path 626 which are respectively connected to a fuel gas tube 32, a preheating oxygen tube 33, and a cutting oxygen tube 34 are disposed within a head frame 620 of a backfire preventing gas cutting apparatus (not shown) according to another embodiment of the present invention.

Here, a valve bundle (not shown) of the backfire preventing gas cutting apparatus according to another embodiment of the present invention includes the fuel gas tube 32, the preheating oxygen tube 33, and the cutting oxygen tube 34. The valve bundle has the same structure as the valve bundle 2 that is described with reference to FIGS. 1 and 2, and thus, its description will be omitted.

Furthermore, since one of the above-described tips (see reference numeral 300 of FIG. 3 and reference numeral 400 of FIG. 9) is applied to the backfire preventing gas cutting apparatus (not shown) according to another embodiment of the prevent invention, its description will be omitted.

The head frame 620 includes an injecting core 650, an inner cap 654, and an outer cap 655.

An injecting core insertion hole 628 is defined in the head frame 620 to connect a fuel gas flow path 624 to a preheating oxygen flow path 625. Also, a cap insertion hole 629 is defined in the head frame 620 to connect the preheating oxygen flow path 625 to a cutting oxygen flow path 626. As described above, the injecting core insertion hole 628 and the cap insertion hole 629 may be connected to each other. The cap insertion hole 629 may have a diameter greater than that of the injecting core insertion hole 628.

The injecting core 650 is inserted into the injecting core insertion hole 628.

A tapered surface 651 is disposed on a front end of the injecting core 650. The tapered surface 651 may have an outer diameter that gradually decreases toward a front end of the injecting core 650.

An outer circumferential surface of a rear end of the injecting core 650 may have a shape corresponding to that of an inner circumferential surface of the injecting core insertion hole 628. The injecting core 650 may be disposed to block a space between the fuel gas flow path 624 and the preheating oxygen flow path 625 and be inserted into the injecting core insertion hole 628.

A preheating oxygen flow path 652 is defined in the injecting core 650. The preheating oxygen flow path 652 may pass through a central portion of the injecting core 650 from the rear end to the front end. A preheating oxygen injection hole 653 having a diameter less than that of the preheating oxygen flow path 652 is defined in the front end of the preheating oxygen flow path 652.

The inner cap 654 is inserted into a cap insertion hole 629. The inner cap 654 has a circular plate shape. An outer circumferential surface of the inner cap 654 has a shape corresponding to an outer circumferential surface of the inside of the cap insertion hole 629. The inner cap 654 is disposed to block a space between the preheating oxygen flow path and the cutting oxygen flow path within the cap insertion hole 629.

Thus, introduction of the preheating oxygen introduced into the preheating oxygen flow path 625 into the cutting oxygen flow path 626 may be prevented by the inner cap 654.

The outer cap 655 may be coupled to cover the cap insertion hole 629. An outer circumferential surface of the outer cap 655 has a shape corresponding to an inner circumferential surface of the rear end of the cap insertion hole 629. The cutting oxygen flowing into the cutting oxygen flow path 626 may not leak to the outside of the head frame 620 by the outer cap 655.

Welding grooves 650a, 654a, and 655a are defined in an outer circumferential surface of a rear end of the injecting core 650, an outer circumferential surface of the inner cap 654, and an outer circumferential surface of the outer cap 655, respectively. As illustrated in FIG. 12, the welding grooves 650a, 654a, 655a may be opened in a direction of the rear end of the head frame 620.

Thus, when the injecting core 650, the inner cap 654, and the outer cap 655 are coupled to the head frame 620, the front end of the head frame 620 may be disposed downward, i.e., in the gravity direction. Then, the injecting core 650 may be seated into the injecting core insertion hole 628 to insert a welding rod (not shown) having a ring shape or a welding material (not shown) having a powder state into the welding groove 650a as described above.

Thereafter, the inner cap 654 is inserted into the cap insertion hole 629. Here, since the cap insertion hole 629 has a diameter greater than that of the injecting core insertion hole 629, a stepped portion may occur between the injecting core insertion hole 629 and the cap insertion hole 629. The inner cap 654 may be supported by the stepped portion and disposed inside the cap insertion hole 629.

After the inner cap 654 is disposed, the welding rod (not shown) having the ring shape or the welding material (not shown) having the powder state may be inserted into the welding groove 654a.

The outer circumferential surface of the outer cap 655 may be forcibly fitted into the inner circumferential surface of the cap insertion hole 629. Thus, when the outer cap 655 is inserted into the cap insertion hole 629, the outer cap 655 may be maintained in a fixed position.

After the outer cap 655 is disposed at an inlet of the cap insertion hole 629, i.e., at a position at which the outer cap 655 covers the cap insertion hole 629, the welding rod (not shown) having the ring shape or the welding material (not shown) having the powder state may be inserted into the welding groove 655a.

Thereafter, the welding rod (not shown) having the ring shape or welding material (not shown) having the powder state which is inserted into the welding grooves 650a, 654a, and 655a may be fused. Here, ultrasonic welding or brazing may be used to fuse the welding rod or welding material.

When the welding rod (not shown) or the welding material (not shown) having the powder state is fused, the head frame 650, the injecting core 650, the inner cap 654, and the outer cap 655 may be weld-coupled and integrated in the welding grooves 650b, 654b, and 655b. Thus, even though the head frame 620 is heated by the heat conducted from the tip (see reference numeral 300 of FIG. 3) by the cutting process or backfire, the damage due to the degradation of the sealing member may not occur. Thus, the arbitrary mixing of the fuel gas, the preheating oxygen, and the cutting oxygen within the head frame 620 may be prevented, and also, the head frame 520 may be used semipermanently.

Particularly, since the head frame 620 is welded after the injecting core 650, the inner cap 654, and the outer cap 655 are successively disposed within the head frame 620, the head frame 620 may be easily manufactured.

An injecting cap part 661 is disposed on a front end of a portion of the inside of the head frame 620 on which the injecting core 650 is disposed. The injecting cap part 661 is disposed to be spaced apart from the front end of the injecting core 650 in the direction of the front end of the head frame 620, and an injecting flow path is defined in a center of the injecting cap part 661.

A tapered surface having a shape that is recessed to the front end of the head frame toward a central portion to correspond to the shape of the tapered surface 551 of the injecting core 650 is disposed around the injecting flow path 662.

A fuel gas chamber 627 connected to the fuel gas flow path 624 is defined around the injecting core part 650. The fuel gas introduced through the fuel gas tube 32 is introduced into the fuel gas chamber 627 via the fuel gas flow path 624.

Thus, the preheating oxygen injected into the preheating oxygen injecting hole 653 defined in the front end of the injecting core 650 is introduced into the injecting flow path 662. Thus, a pressure around the tapered surface 651 may be relatively lowered. Thus, the fuel gas within the fuel gas chamber 627 is introduced into the injecting flow path 662 together with the preheating oxygen, and the fuel gas and preheating oxygen may laminar flow in the injecting flow path 662.

As described above, the injecting part may be defined within the head frame 620 by the injecting core 650, the injecting cap part 661, and the fuel gas chamber 627 in another embodiment of the present invention. Since the fixing pin 623 is equal to the fixing pin 423 that is described with reference to FIG. 9, its description will be omitted.

According to the embodiments of the present invention, since a combustible mixed gas in which the preheat oxygen and the fuel gas are mixed with each other is generated in the tip, if the backfire occurs, the flame may not reach the head. Thus, a difference in pressure within the tip may be reduced to fundamentally prevent the backfire from occurring, thereby extending a lifecycle of the head.

Also, according to the embodiments of the present invention, since it is unnecessary to provide the sealing member that is vulnerable to heat, the sealed state of the injecting part may be maintained even though the head is heated to improve the durability and stability.

Also, according to the embodiments of the present invention, since the injecting part (in which the preheating oxygen and the fuel gas laminar flow) in which the injecting gas (oxygen and gas which are not mixed with each other) is generated is disposed within the head, the reduction of the flame power due to the leakage of the fuel gas and the possibility of the accident occurrence due to the backfire may be minimized to enhance the flame power.

Also, according to the embodiments of the present invention, the injection part provided in the head may be simplified to reduce the manufacturing time and cost.

Also, according to the embodiments of the present invention, the cooling flow path along which the cutting oxygen flows may be defined in the tip to cool the tip, thereby minimizing the heating of the head in working.

The prevent invention will be additionally described.

Figure 13:
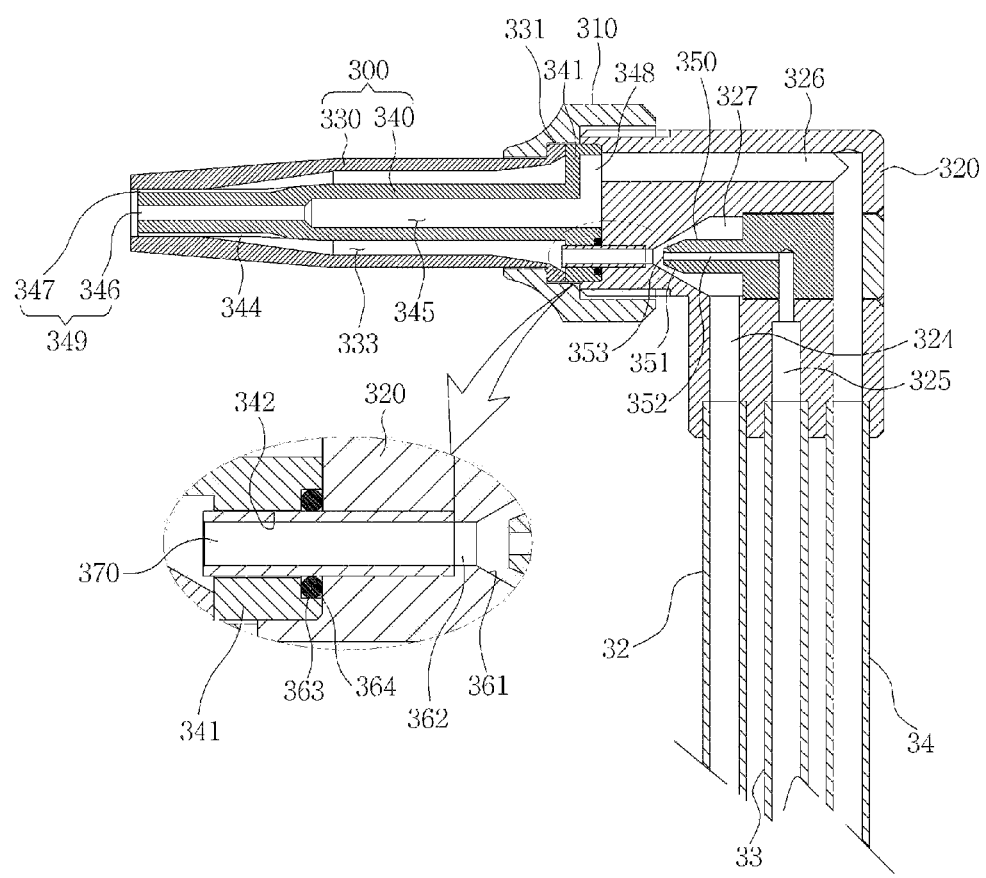
FIG. 13 is a cross-sectional view of a head of a nozzle bundle in the backfire preventing gas cutting apparatus according to the present invention.
Figure 14:
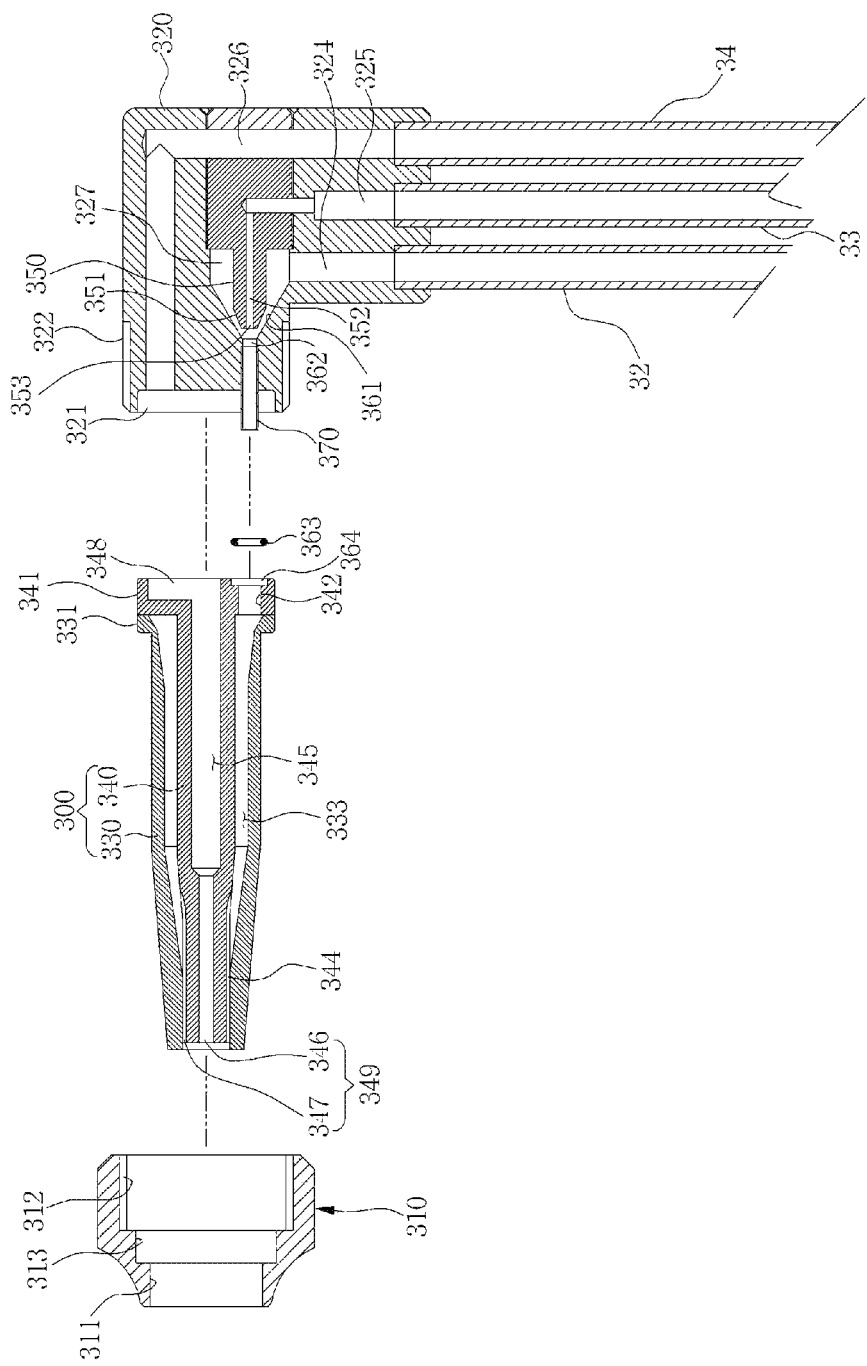
FIG. 14 is an exploded cross-sectional view of the head illustrated in FIG. 13.

First, since the descriptions with reference to FIGS. 13 and 14 are substantially the same as the above-described contents, their detailed description will be omitted.

FIG. 13 is a cross-sectional view of a head in the backfire preventing gas cutting apparatus illustrated in FIG. 1, and FIG. 14 is an exploded cross-sectional view of the head illustrated in FIG. 13. The description will be made with reference to FIGS. 13 and 14.

Referring to FIGS. 13 and 14, a fuel gas flow path 324, a preheating oxygen flow path 325, and a cutting oxygen flow path 326 which are respectively connected to the fuel gas tube 32, the preheating oxygen tube 33, and the cutting oxygen tube 34 are disposed within the head frame 320.

The duplicated description of the above-described components will be omitted. However, an alignment tube 370 will be described with reference to FIG. 18.

Figure 15:
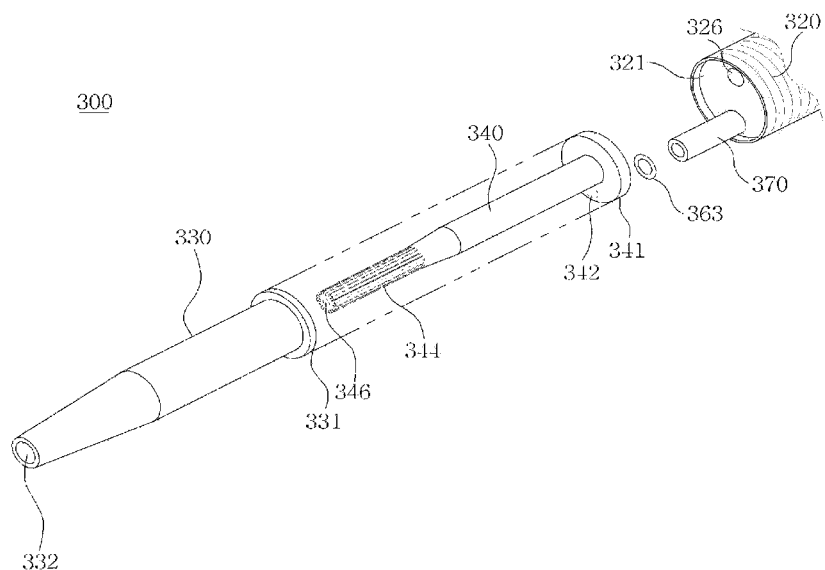
FIG. 15 is an exploded perspective view of a tip illustrated in FIG. 13.

FIG. 15 is an exploded perspective view of the tip illustrated in FIG. 13. Referring to FIG. 15, a flange part 331 having an expanded diameter is disposed on a rear end of the outer tip 330, and also, a flange part 341 having an expanded diameter is disposed on a rear end of the inner tip 340.

The flange part 341 of the inner tip 340 and the flange part 331 of the outer tip 330 may have the same outer diameter. A portion of the flange part 341 of the inner tip 340 is inserted into the seating groove 321 of the head frame 320.

Thus, as illustrated in FIGS. 13 and 14, when the tip 300 is fixed to the head frame 320 by the coupling member 310, a portion of the flange part 341 of the inner tip 340 is seated in the seating groove 321, and the flange part 331 of the outer tip 330 is pressed by the coupling member 310 in a state where the flange part 331 overlaps the flange part 341 of the inner tip 340.

Here, an alignment hole 313 into which a portion of the flange part 331 of the outer tip 330 and a portion of the flange part 341 of the inner tip 340 are inserted in a state where the ft portion of the flange part 331 of the outer tip 330 and the portion of the flange part 341 of the inner tip 340 overlap each other is defined between an insertion hole 311 and a screw thread part 312 of the coupling member 310. When the tip 300 is coupled to the head frame 320, the flange part 331 of the outer tip 330 and the flange part 341 of the inner tip 340 may be inserted into the alignment hole 313, and thus, the centers of the outer tip 330 and the inner tip 340 may be the automatically aligned with each other. Thus, the assemblity of the tip 300 may be improved, and the gas may smoothly and concentrically flow into the gas passage defined in a circumferential direction.

An injecting gas inlet hole 342 passes through the flange part 341 of the inner tip 340. When a rear end surface of the flange part 331 of the outer tip 330 contacts the flange part 341 of the inner tip 340, the injecting gas inlet hole 342 may be connected to a mixed gas flow path 333.

As illustrated in FIG. 15, each of the outer tip 330 and the inner tip 340 may have an outer diameter that gradually decreases in a direction of the front end thereof. The cutting oxygen flow path 345 that passes from the rear end to the front end is defined in the inner tip 340, and the front end of the cutting oxygen flow path 345 defines a cutting oxygen injecting hole 346.

A plurality of slits 344 that are radially disposed with respect to the cutting oxygen injecting hole 346 are defined in an outer circumferential surface of the portion at which the outer diameter of the inner tip 340 decreases. A through hole 332 is defined in the front end of the outer tip 330. When the inner tip 340 is inserted into the outer tip 330, the portion at which the outer diameter of the inner tip 340 decreases is inserted into the through hole 332 of the outer tip 330.

Here, the portion at which the outer diameter of the inner tip 340 decreases may correspond to an inner diameter of the through hole 332 of the outer tip 330.

An intermediate portion of the inner tip 340 may have an outer diameter less than an inner diameter of an intermediate portion of the outer tip 330. Thus, as illustrated in FIG. 13, when the inner tip 340 is inserted into the outer tip 330, a mixed gas flow path 33 is defined between the outer circumferential surface of the inner tip 340 and the inner circumferential surface of the outer tip 330.

Thus, when the cutting oxygen is supplied into the central portion of the rear end surface of the tip 300, the cutting oxygen is injected into the cutting oxygen injecting hole 346 via the cutting oxygen flow path 345. The injecting gas introduced into the injecting gas inlet hole 342 is injected into the mixed gas injecting hole (see reference numeral 347 of FIG. 6) between the through hole 332 and the slit 344 through the slit 344 via the mixed gas flow path 333. This will be described with reference to FIG. 16.

Figure 16:
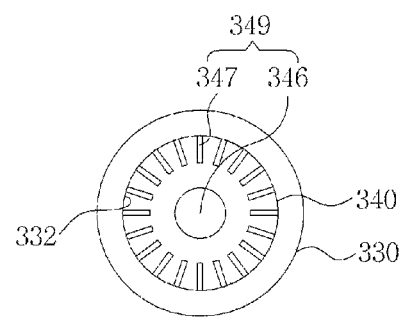
FIG. 16 is a side view of a front end of the tip illustrated in FIG. 13.

FIG. 16 is a side view of the front end of the tip of FIG. 13. Referring to FIG. 16, the cutting oxygen injecting hole 346 and the mixed gas injecting hole 347 are defined in the flame outlet 349.

As described above, the cutting oxygen injecting hole 346 is defined in the central portion of the inner tip 340, and the mixed gas injecting hole 347 is radially defined around the cutting oxygen injecting hole 346.

Here, the mixed gas injecting hole 347 is defined by the slits (see reference numeral 344 of FIG. 15). When the mixed gas injected into the mixed gas injecting hole 347 is ignited to sufficiently heat the workpiece (not shown), and then, the cutting oxygen is injected through the cutting oxygen injecting hole 346, the workpiece (not shown) may be oxidized to cut the workpiece (not shown).

Figure 17:
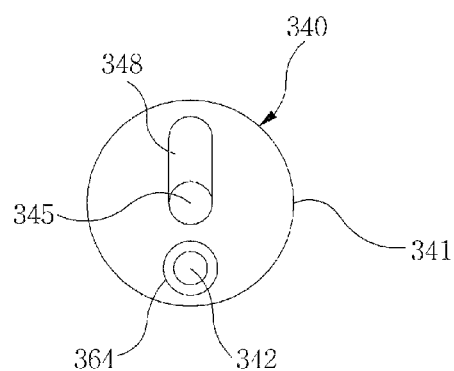
FIG. 17 is a side view of a rear end of the tip illustrated in FIG. 13.

FIG. 17 is a side view of the rear end of the tip of FIG. 13. Referring to FIG. 17, the rear end of the cutting oxygen flow path 345 is disposed at the central portion of the rear end surface of the flange part 341 of the inner tip 340, and the connection passage 348 defined in a radius direction to the outside of the flange part 341 from the cutting oxygen flow path 345 is provided. The connection flow path 348 allows the cutting oxygen flow path 326 of the head frame 320 to communicate with the cutting oxygen flow path 345 of the inner tip 340. Also, the injecting gas inlet hole (see reference numeral 342 of FIG. 13) is defined in an edge portion of the cutting oxygen flow path 345.

That is, as described above, to inject the cutting oxygen into the cutting oxygen injecting hole 346 and the mixed gas into the mixed gas injecting hole 347, the cutting oxygen has to be supplied into the cutting oxygen flow path 345, and the injecting gas has to be introduced from the injecting gas inlet hole 342.

Here, if the heat is transferred through the connection flow path 348 when compared that high-temperature heat is directly transferred to the cutting oxygen flow path 326 of the head frame 320 through the cutting oxygen flow path 345 of the tip 300, the heat transfer may be delayed to maximally prevent the head frame 320 from being overheated.

Figure 18:
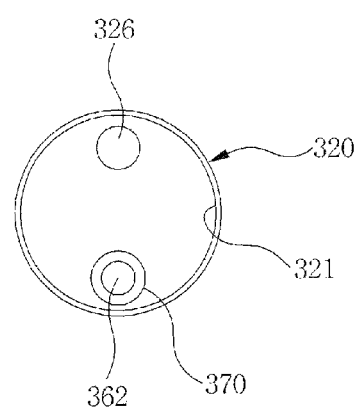
FIG. 18 is a side view of a front end of a head frame illustrated in FIG. 13.

FIG. 18 is a view of the front end of the head frame 320 illustrated in FIG. 13.

Referring to FIG. 18, the front end of the cutting oxygen flow path 326 and the front end of the injecting flow path 362 are disposed in the seating groove (see reference numeral 321 of FIG. 14) defined in the front end of the head frame 320.

Here, an alignment tube 370 is fitted and fixed to one side of the injecting flow path 362 of the head frame 320 or the injecting gas inlet hole 342 of the tip 300, for example, the injecting flow path 362 of the head frame 320 as illustrated in FIGS. 13 to 15 in the current embodiment. When coupled to the tip 300, the alignment tube 370 may be fitted into the injecting gas inlet hole 342 to match centers of the injecting flow path 362 and the injecting gas inlet hole 342. Thus, the injecting flow path 362 and the alignment tube 370 may have the same inner diameter.

On the other hand, although not shown, the alignment tube 370 is fitted into the injecting gas inlet hole 342 of the tip 300. When coupled to the head frame 320, the alignment tube 370 may be fitted into the injecting flow path 362 to match the centers of the injecting flow path 362 and the injecting gas inlet hole 342.

Also, according to the present invention, a packing 363 fitted to an outer circumferential surface of the alignment tube 370 is provided. A packing groove 364 into which the packing 363 is inserted is defined in the inner tip 340 of the tip 300 to maintain sealing between the alignment tube 370, the head frame 320 including the alignment tube 370, and the inner tip 340 while the head frame 320 and the tip 300 are coupled to each other. Thus, the mixing of the mixed gas flowing through the mixed gas flow path 333 and the cutting oxygen flowing through the cutting oxygen flow path 345 may be prevented by the packing 363.

An inner structure of the head frame 320 will be described with reference to FIGS. 3 and 4. Here, descriptions duplicated in FIGS. 3 and 4 will be omitted.

A tapered surface 361 having a shape corresponding to that of a tapered surface 351 is disposed to be spaced at a front side of the front end of the injecting core 350 on which the tapered surface 351 is disposed.

Thus, a gap between the tapered surface 351 and the tapered surface 361 may occur. This gap may communicate with the fuel gas chamber 327.

A preheating oxygen flow path 352 defined in the central portion of the injecting core 350 is connected to a preheating oxygen flow path 325 defined in the head frame 320 at the rear end of the injecting core 350. Thus, the preheating oxygen introduced through the preheating oxygen flow path 325 is introduced into the rear end of the injecting core 350 and then injected into the preheating oxygen injecting hole 353 via the preheating oxygen flow path 352. The preheating oxygen injected into the preheating oxygen injecting hole 353 is introduced into the injecting flow path 362.

In this process, a low pressure is generated between the tapered surfaces 350 and 351 of the injecting core 350 by the flow of the preheating oxygen injected at a high rate. Thus, the fuel gas introduced into the fuel gas chamber 327 via the fuel gas flow path 324 may be introduced between the two tapered surfaces 351 and 361 and then introduced into the injecting flow path 362 together with the preheating oxygen.

As described above, the preheating oxygen and fuel oxygen introduced into the injecting flow path 362 may (laminar) flow to form a layer while flowing through the injecting flow path 362 and the injecting gas inlet hole 342 connected to the injecting flow path 362.

Thereafter, the preheating oxygen and fuel oxygen may be mixed with each other in the mixing room and then be injected into the mixed gas injecting hole (see reference numeral 347 of FIG. 16) via the fixed gas flow path 333.

Thus, as described above, in the backfire preventing gas cutting apparatus (see reference numeral 1 of FIG. 1) according to an embodiment of the present invention, since the injecting part is disposed within the head frame 320, even though the backfire occurs in use, the flame may reach the injecting flow path 362. Thus, possibility of explosion due to the backfire and overheating of the head frame 320 may be very low.

Also, the fuel gas within the fuel gas chamber 327 may be suctioned into the injecting flow path 362 by the high-rate injection of the preheating oxygen having a pressure higher than that of the fuel gas to laminar flow. Thus, unlike a method in which the flame power depends on a supply pressure of the fuel gas, the fuel gas may be stably supplied to maintain uniform flame power.

As described above, the head frame 320 does not require a separate sealing member for preventing the preheating oxygen and the cutting oxygen from being mixed with each other. That is, since the random mixing of the preheating oxygen and the cutting oxygen is prevented without using the sealing member formed of an elastic material, the mixing of the fuel gas, the preheating oxygen, and the cutting oxygen by damage of the sealing member due to the degradation by the heating of the head frame 320 may not occur.

Figure 19:
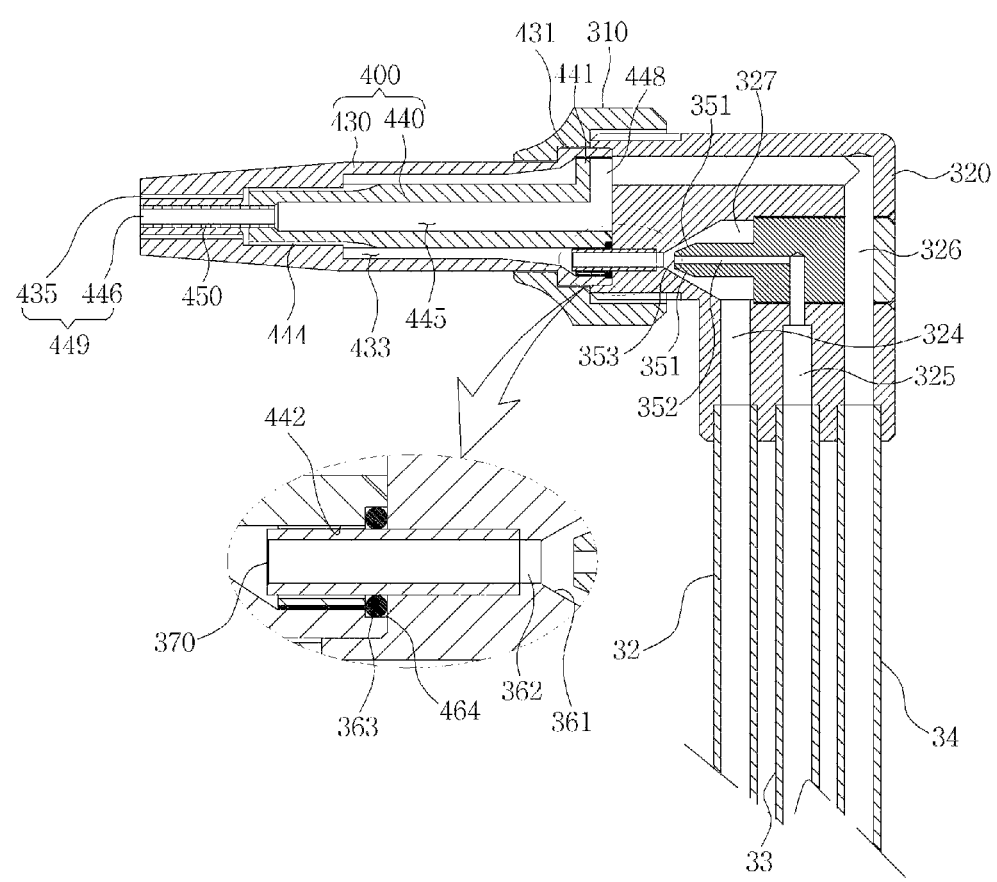
FIG. 19 is a cross-sectional view of a head of in a backfire preventing gas cutting apparatus according to another embodiment of the present invention.
Figure 20:
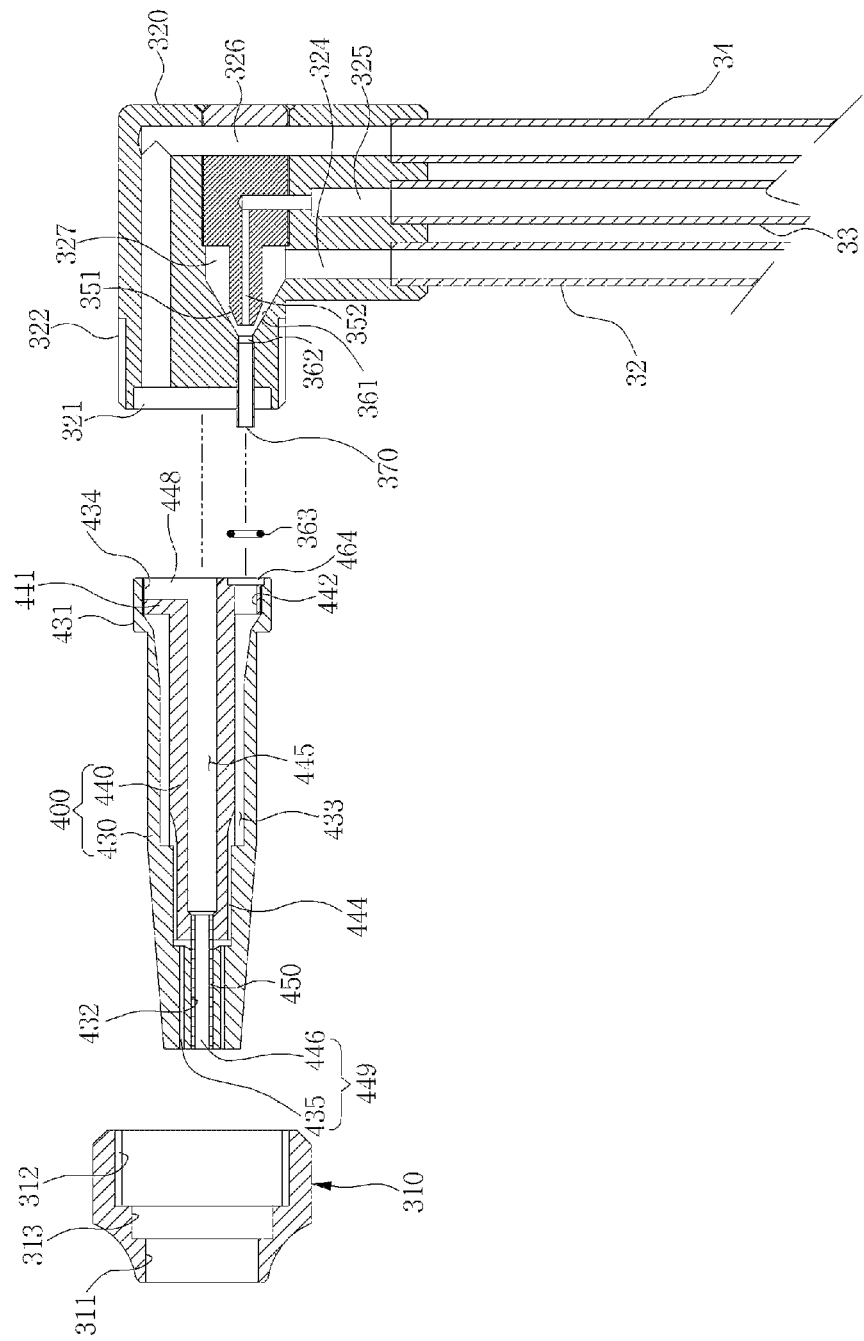
FIG. 20 is an exploded cross-sectional view of the head illustrated in FIG. 19.
Figure 21:
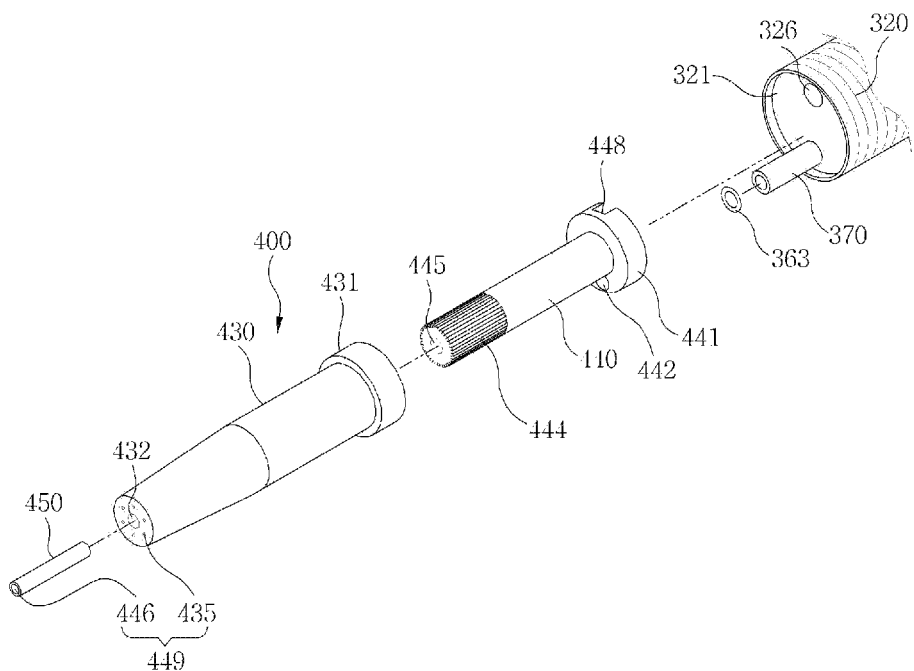
FIG. 21 is an exploded perspective view of a tip illustrated in FIG. 19.

FIG. 19 is a cross-sectional view of a head of in a backfire preventing gas cutting apparatus according to another embodiment of the present invention, FIG. 20 is an exploded cross-sectional view of the head, and FIG. 21 is an exploded perspective view of a tip constituting the head. The tip 300 according to the foregoing embodiment may be exclusively used if the fuel gas is LPG. The tip 400 according to the current embodiment may be exclusively used if the fuel gas is acetylene.

Thus, the current embodiment is the same as the foregoing embodiment except for the tip. As a result, the tip may be replaced according to the fuel gas.

Hereinafter, a structure and effect of the tip 400 for acetylene will be described. Constitutions of the head frame 320 will be given by the same reference numeral as those according to the foregoing embodiment, and thus, their detailed descriptions will be omitted.

A tip 400 of FIGS. 19 to 21 includes an outer tip 430 and an inner tip 440. The inner tip 440 is disposed in a space defined within the outer tip 430. As described above, the inside of the tip 400 may have a dual tube shape in which a cutting oxygen flow path 445 and a mixed gas flow path 433 are defined.

FIG. 21 is an exploded perspective view of the tip of FIG. 21. Referring to FIG. 21, a flange part 431 having an expanded diameter is disposed on a rear end of the outer tip 430, and also, a flange part 441 having an expanded diameter is disposed on a rear end of the inner tip 440.

Here, the flange part 431 of the outer tip 430 has a diameter greater than that of the flange part 441 of the inner tip 440. An assembly hole 434 into which the flange part 441 is fitted is provided. One portion of the flange part 431 is inserted into an alignment hole 313 of a coupling member 310, and the other portion is inserted into a seating groove 321 of a head frame 320.

Thus, as illustrated in FIG. 19, when the tip 400 is fixed to the head frame 320 by the coupling member 310, the flange part 431 of the inner tip 430 is seated in the seating groove 321, and the flange part 441 of the outer tip 440 is pressed by the coupling member 310 in a state where the flange part 441 of the inner tip 440 is inserted into the assembly hole 434 defined in the flange part 431 of the outer tip 430.

The flange part 431 of the outer tip 430 and the flange part 441 of the inner tip 440 may be fixed or press-fitted by welding so that an assembled state thereof is firmly maintained. Thus, the assembly of the tip 400 may be improved, and the gas flow path in a circumferential direction may be concentrically and uniformly maintained to realize the smooth gas flow.

An injecting gas inlet hole 442 connected to a mixed gas flow path 433 is defined to pass through the flange part 441 of the inner tip 440. A cutting oxygen flow path 445 passing from a rear end to a front end of the inner tip 440 is defined. Also, a connection tube 450 is fitted and fixed to a front end of a cutting oxygen flow path 445, and an end of the connection tube 450 defines a cutting oxygen injecting hole 446.

A plurality of slits 444 that are radially defined are defined in an outer circumferential surface of the front end of the inner tip 440 to allow the mixed oxygen to flow between the outer tip 430 and the inner tip 440. The front end of the outer tip 430 may have a length greater than that of the front end of the inner tip 440 to form a through hole 432. The connection tube 450 is fitted and fixed to the through hole 432, and a plurality of mixed gas injecting holes 435 with respect to a center of the cutting oxygen injecting hole 446 are defined in the front end of the outer tip 430 in a circumferential direction. A rear end of the mixed gas injecting hole 435 communicates with the mixed gas flow path 433 through the slits 444.

Thus, when the cutting oxygen is supplied into the rear end surface of the tip 400, the cutting oxygen is injected into the cutting oxygen injecting hole 446 via the cutting oxygen flow path 445 and the connection tube 450. The injecting gas introduced into the injecting gas inlet hole 433 is mixed in the mixing room to generate a mixed gas and then inject the mixed gas into the mixed gas injecting hole 435 through the slits 444. This will be described with reference to FIG. 22.

Figure 22:
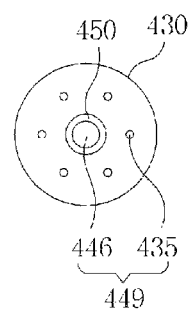
FIG. 22 is a side view of a front end of the tip illustrated in FIG. 19.

FIG. 22 is a side view of the front end of the tip of FIG. 19. Referring to FIG. 22, a flame outlet 449 is defined by the cutting oxygen injecting hole 446 and the mixed gas injecting hole 435.

As described above, the cutting oxygen injecting hole 446 is defined in the central portion of the inner tip 440, and a plurality of mixed gas injecting holes 435 are defined in a circumferential direction around the cutting oxygen injecting hole 446.

Here, when the mixed gas injected into the mixed gas injecting hole 347 is ignited to sufficiently heat the workpiece (not shown), and then, the cutting oxygen is injected through the cutting oxygen injecting hole 446, the workpiece (not shown) may be oxidized to cut the workpiece (not shown).

Figure 23:
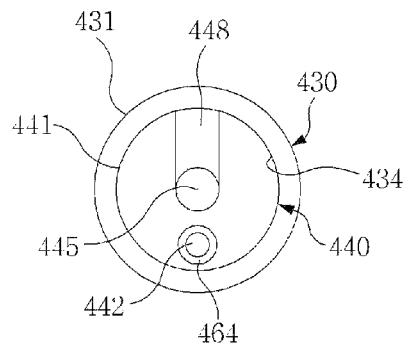
FIG. 23 is a side view of a rear end of the tip illustrated in FIG. 19.

FIG. 23 is a side view of the rear end of the tip of FIG. 19. Referring to FIG. 23, the rear end of the cutting oxygen flow path 445 is disposed at the central portion of the rear end surface of the flange part 441 of the inner tip 440, and the connection passage 448 defined in a radius direction to the outside of the flange part 441 from the cutting oxygen flow path 445 is provided. As illustrated in FIG. 19, the connection flow path 448 allows the cutting oxygen flow path 326 of the head frame 320 to communicate with the cutting oxygen flow path 445 of the inner tip 440. Also, the injecting gas inlet hole (see reference numeral 442 of FIG. 20) and a packing groove 464 are defined in an edge portion of the cutting oxygen flow path 442.

That is, as described above, to inject the cutting oxygen into the cutting oxygen injecting hole 446 and the mixed gas into the mixed gas injecting hole 435, the cutting oxygen has to be supplied into the cutting oxygen flow path 445, and the injecting gas has to be introduced from the injecting gas inlet hole 433 to generate the mixed gas.

Here, if the heat is transferred through the connection flow path 448 when compared that high-temperature heat is directly transferred to the cutting oxygen flow path 326 of the head frame 320 through the cutting oxygen flow path 445 of the tip 400, the heat transfer may be delayed to maximally prevent the head frame 320 from being overheated.

The same operation as the above-described tip 300 may be performed by the tip 400. If LPG is used as the fuel gas, the tip 300 for the LPG may be mounted on the head frame 320 and used. If acetylene is used as the fuel gas, the tip 400 for the acetylene may be mounted on the head frame 320 and used.

According to the embodiment of the present invention, when the head fame and the tip are coupled to each other, the alignment tube that is fixed to one side of the injection flow path of the head frame and the injecting gas inlet hole of the tip may be simply fitted into the injection flow path or the injecting gas inlet hole which is disposed in the other side of the injection flow path to allow the centers of the injecting flow path of the head frame and the injecting gas inlet hole of the tip to accurately match each other. Thus, when the head frame and the tip are coupled to each other, the process of aligning the injecting flow path with the injecting gas inlet hole may be very quickly and easily performed even the non-skilled person. Also, since the movement of the tip with respect to the head frame may be prevented by the alignment tube, even though the backfire preventing gas cutting apparatus is used for a long time, and the misalignment between the injecting flow path and the injecting gas inlet hole may be prevented so that the gas is smoothly supplied.

Also, the packing fitted around the alignment tube may be provided, and the packing groove in which the packing is inserted may be defined in a side of the injecting gas inlet hole. Thus, when the head frame and the tip are coupled to each other, the sealing between the alignment tube and the head frame including the alignment tube or tip may be maintained. In addition, even through the fine gap between the head frame and the tip is formed due the long-time using, the sealing between the cutting oxygen flow path and the injecting gas inlet hole may be maintained by the packing to prevent the backfire from occurring.

Also, according to the present invention, since the flange part disposed on each of the inner and outer tips constituting the tip is fitted in the state where the flange part overlaps the alignment hole of the coupling member and then is hooked with a protrusion disposed on an inner surface of the coupling member, when the head frame and the tip are coupled to each other, the centers of the inner and outer tips constituting the tip may automatically match each other. Thus, the assembly of the tip may be improved, and the gas path in a circumferential direction may be uniformly disposed in a concentric shape to smoothly maintain the flow of the gas.

Also, according to the present invention, the connection flow path may be formed from the cutting oxygen flow path disposed at the central portion of the tip to the outside in a radius direction to connect the cutting oxygen flow path of the head frame to the cutting oxygen flow path of the tip. Thus, when compared that the high-temperature heat is directly transferred into the cutting oxygen flow path of the head fame through the cutting oxygen flow path of the tip, the heat transfer through the connection flow path may be delayed to maximally prevent the heat frame from being overheated.

The prevent invention will be additionally described below.

Figure 24:
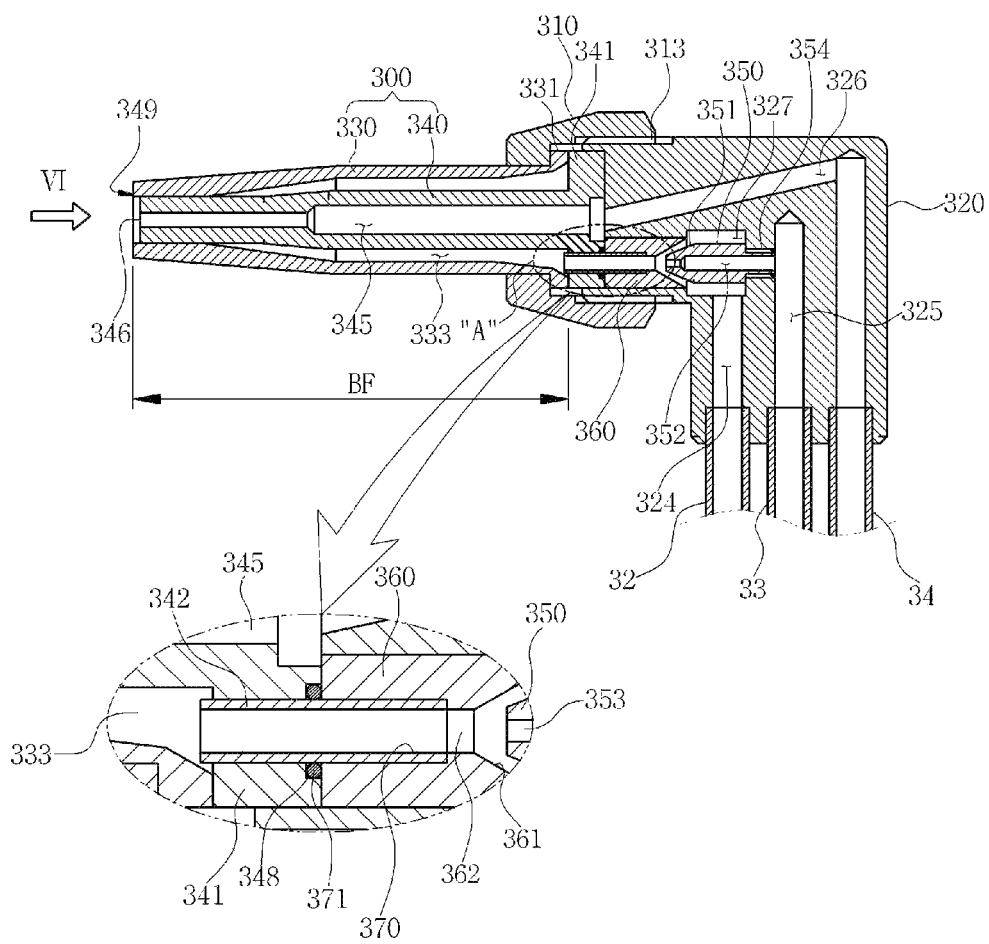
FIG. 24 is a cross-sectional view of the head of the gas cutting apparatus illustrated in FIG. 1 and a detailed enlarged view of a portion "A".
Figure 25:
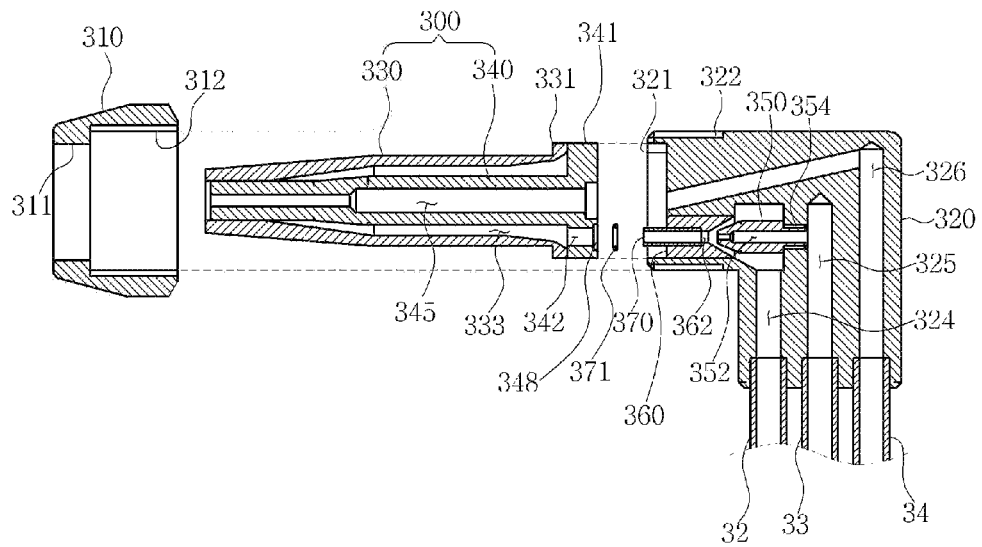
FIG. 25 is an exploded cross-sectional view of the head illustrated in FIG. 24.
Figure 26:
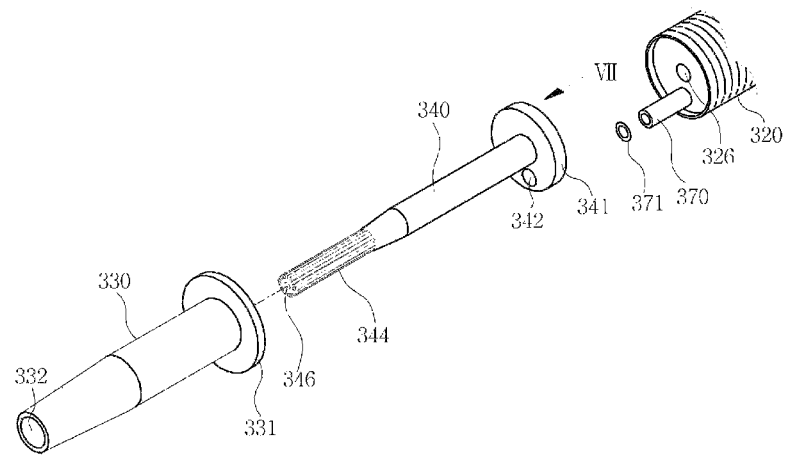
FIG. 26 is an exploded perspective view of a tip illustrated in FIG. 24.
Figure 27:
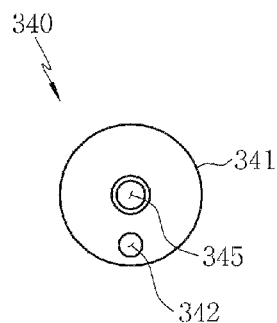
FIG. 27 is a view illustrating a rear end of an inner tip in a VII direction in FIG. 26.
Figure 28:
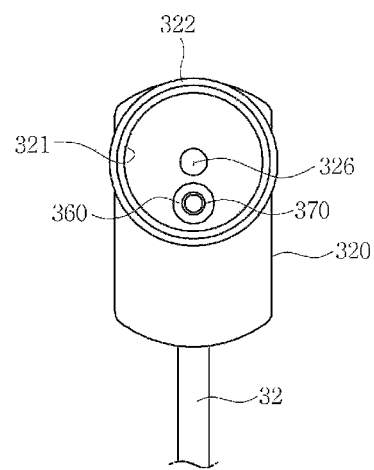
FIG. 28 is a view of a front end of a head frame illustrated in FIG. 24.
Figure 29:
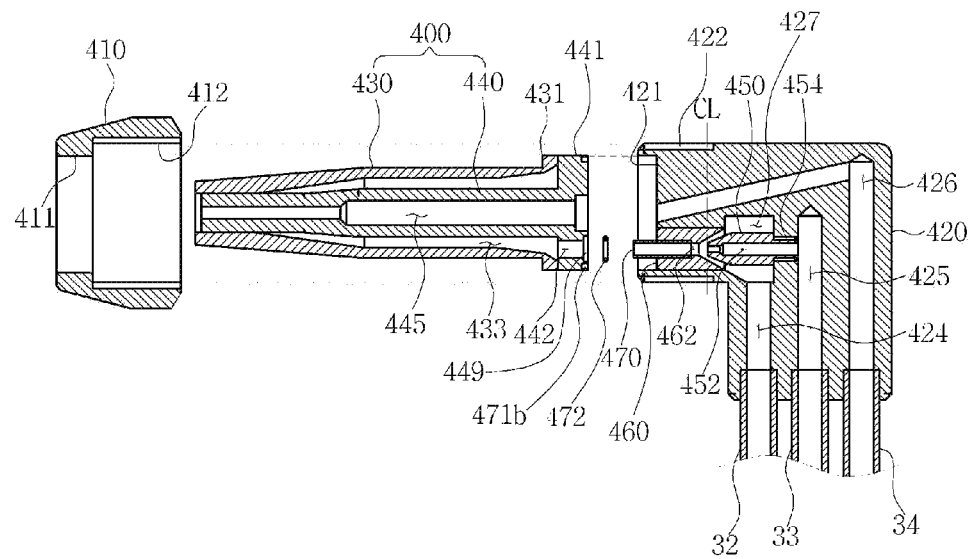
FIG. 29 is an exploded cross-sectional view of a heat part of a gas cutting apparatus according to another embodiment of the present invention.
Figure 30:
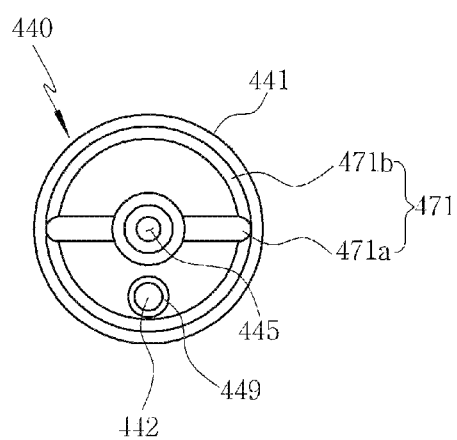
FIG. 30 is a view of a rear end of a tip illustrated in FIG. 29.
Figure 31:
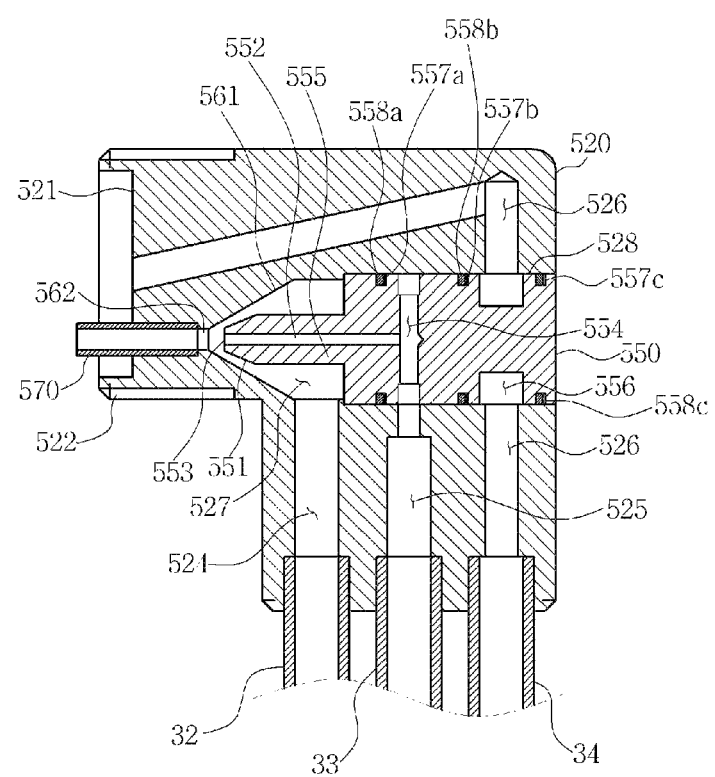
FIG. 31 is a cross-sectional view of the head frame of the gas cutting apparatus according to another embodiment of the present invention.
Figure 32:
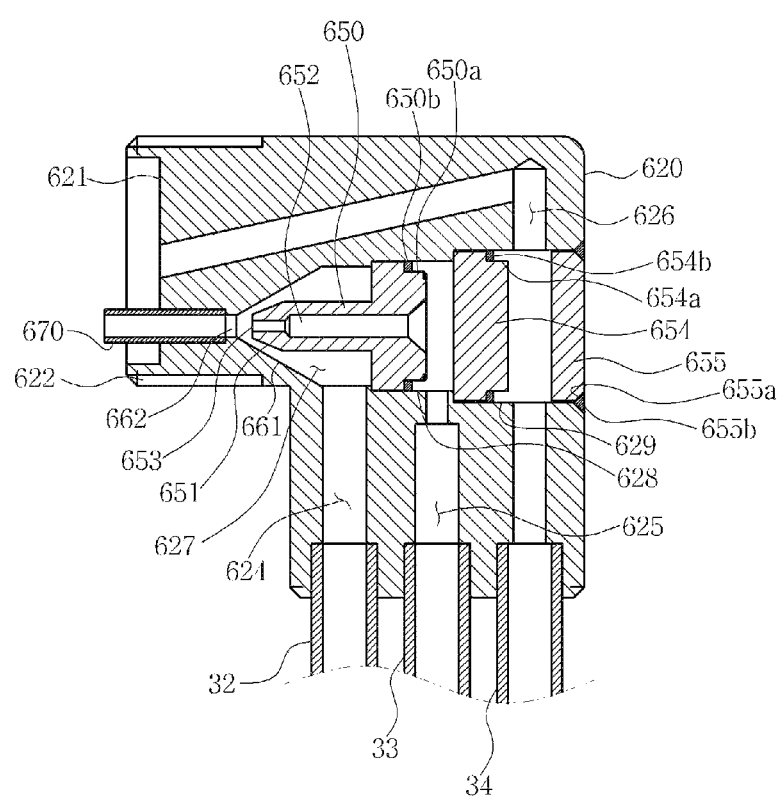
FIG. 32 is a cross-sectional view of a head frame of a gas cutting apparatus according to further another embodiment of the present invention.

FIG. 24 is a cross-sectional view of the head of the gas cutting apparatus illustrated in FIG. 1 and a detailed enlarged view of a portion "A", FIG. 25 is an exploded cross-sectional view of the head illustrated in FIG. 24, FIG. 26 is an exploded perspective view of a tip illustrated in FIG. 24, FIG. 27 is a view illustrating a rear end of an inner tip in a VII direction in FIG. 26, FIG. 28 is a view of a front end of a head frame illustrated in FIG. 24, FIG. 29 is an exploded cross-sectional view of a heat part of a gas cutting apparatus according to another embodiment of the present invention, FIG. 31 is a cross-sectional view of the head frame of the gas cutting apparatus according to another embodiment of the present invention, and FIG. 32 is a cross-sectional view of a head frame of a gas cutting apparatus according to further another embodiment of the present invention.

First, in the description of the drawings, the same or substantially the same component described with reference to FIGS. 1 to 23 will be omitted, but technical ideas may be interpreted as the same.

FIG. 24 is a cross-sectional view of the head in the backfire preventing gas cutting apparatus illustrated in FIG. 1. FIG. 24 illustrates a detailed enlarged view of a portion "A", and FIG. 25 illustrates an exploded cross-sectional view of the head illustrated in FIG. 24.

In a state where an alignment tube 370 is fitted and fixed to one side of the injecting flow path 362 of the head frame 320 or the injecting gas inlet hole 342, for example, the injecting flow path 362 of the head frame 320 as illustrated in FIGS. 24 to 27 in the current embodiment, when coupled to the tip 300, the alignment tube 370 may be fitted into the injecting gas inlet hole 342 defined in the tip 300.

Thus, centers of the injecting flow path 362 and the injecting gas inlet hole 342 may match each other, and the injecting flow path 362 and the alignment tube 370 have the same inner diameter.

On the other hand, although not shown, the alignment tube 370 is fitted into the injecting gas inlet hole 342 of the tip 300. When coupled to the head frame 320, the alignment tube 370 may be fitted into the injecting flow path 362 to match the centers of the injecting flow path 362 and the injecting gas inlet hole 342.

Also, a packing 371 fitted onto a circumferential surface of the alignment tube 370 is provided on an outer circumferential surface of the alignment tube 370. A packing groove 348 into which the packing 371 is inserted is defined in the inner tip 340 of the tip 300 to maintain sealing between the alignment tube 370 and the inner tip 340 while the head frame 320 and the tip 300 are coupled to each other.

Thus, the mixing of the mixed gas flowing through the mixed gas flow path 333 and the cutting oxygen flowing through the cutting oxygen flow path 345 may be prevented by the packing 371.

According to the present invention, since the combustible mixed gas in which the preheating oxygen and the fuel gas are mixed with each other is generated in the tip to reduce a difference in pressure of the mixed gas due to the short flow path within the tip, thereby preventing the backfire from occurring. Therefore, the torch in addition to the tip and the head may be extended in lifecycle, and the worker's safety may be maintained.

According to the present invention since the injection part is disposed within the head, the reduction of the flame power due to the leakage of the fuel gas and the possibility of the accident occurrence due to the backfire may be minimized to enhance the flame power. In addition, the injecting part may be simplified in structure to reduce the manufacturing time and cost.

The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

The invention claimed is:

1. A backfire preventing gas cutting apparatus, comprising:
    a valve bundle in which a preheating oxygen and a fuel gas separately flow;
    a nozzle bundle coupled to the valve bundle and in which a flame outlet is disposed;
    a branch part disposed in the valve bundle, wherein the oxygen is divided into cutting oxygen and preheating oxygen through the branch part to flow into the nozzle bundle through respective flow paths, and wherein the nozzle bundle comprises a tip having the flame outlet disposed at a front end thereof and a head frame to which the tip is coupled;
    a cutting oxygen flow path through which the cutting oxygen introduced from the valve bundle flows into the tip;
    an injecting flow path through which the preheating oxygen and the fuel gas introduced from the valve bundle flow into the tip;

an injecting part for enabling a laminar flow of the fuel gas through the injecting flow path by increasing a flow rate of the preheating oxygen introduced into the injecting flow path, wherein the cutting oxygen flow path, the injecting flow path and the injecting part are defined in the head frame;

a cutting oxygen inlet hole connected to the cutting oxygen flow path and an injecting gas inlet hole connected to the injecting flow path respectively defined in a rear end of the tip; and a mixing room disposed in the tip and having a cross-sectional area greater than that of the injecting gas inlet hole so as to generate a combustible mixed gas from the preheating oxygen and the fuel gas which are introduced from the injecting gas inlet hole while generating the laminar flow, wherein the preheating oxygen and the fuel gas maintain the laminar flow while passing through the injecting flow path and the injecting gas inlet hole, thereby generating the combustible mixed gas when the preheating oxygen and the fuel gas reach the mixing room, and wherein the injecting part comprises:

an injecting core having a tapered surface having an outer diameter that gradually decreases toward a front end thereof and a preheating oxygen injecting hole through which the preheating oxygen introduced into a rear end thereof is injected to the front end; and an injecting cap having a shape corresponding to that of the front end of the injecting core and disposed to be spaced in a direction of the front end of the injecting core, the injecting cap having the injecting flow path in a central portion thereof, wherein a fuel gas chamber through which the fuel gas introduced from the valve bundle flows into the injecting flow path is defined between the injecting core and the injecting cap.

2. The backfire preventing gas cutting apparatus according to claim 1, wherein a cutting oxygen injecting hole defined in a central portion of the flame outlet and through which the cutting oxygen is injected and a mixed gas injecting hole defined around the cutting oxygen injecting hole and through which the mixed gas is injected are defined in the flame outlet.

3. The backfire preventing gas cutting apparatus according to claim 1, wherein the injecting core, the injecting flow path, the injecting gas inlet hole, and the mixing room are disposed in a line.

4. A backfire preventing gas cutting apparatus, comprising:

a valve bundle in which a preheating oxygen and a fuel gas separately flow;

a nozzle bundle coupled to the valve bundle and in which a flame outlet is disposed;

a branch part disposed in the valve bundle, wherein the oxygen is divided into cutting oxygen and preheating oxygen through the branch part to flow into the nozzle bundle through respective flow paths, and wherein the nozzle bundle comprises a tip having the flame outlet disposed at a front end thereof and a head frame to which the tip is coupled;

a cutting oxygen flow path through which the cutting oxygen introduced from the valve bundle flows into the tip;

an injecting flow path through which the preheating oxygen and the fuel gas introduced from the valve bundle flow into the tip;

an injecting part for enabling a laminar flow of the fuel gas through the injecting flow path by increasing a flow rate of the preheating oxygen introduced into the injecting flow path, wherein the cutting oxygen flow path, the injecting flow path and the injecting part are defined in the head frame;

a cutting oxygen inlet hole connected to the cutting oxygen flow path and an injecting gas inlet hole connected to the injecting flow path respectively defined in a rear end of the tip; and a mixing room disposed in the tip and having a cross-sectional area greater than that of the injecting gas inlet hole so as to generate a combustible mixed gas from the preheating oxygen and the fuel gas which are introduced from the injecting gas inlet hole while generating the laminar flow, wherein the preheating oxygen and the fuel gas maintain the laminar flow while passing through the injecting flow path and the injecting gas inlet hole, thereby generating the combustible mixed gas when the preheating oxygen and the fuel gas reach the mixing room, wherein one end of an alignment tube is fixed to one side of the injecting flow path of the head frame or the injecting gas inlet hole of the tip, and when the head frame and the tip are coupled to each other, an exposed end of the alignment tube is fitted into the injecting gas inlet hole or the injecting flow path which are disposed in another side to match centers of the injecting flow path of the head frame and the injecting gas inlet hole of the tip with each other.

* * * * *